US010552661B2

(12) United States Patent
Walch et al.

(10) Patent No.: US 10,552,661 B2
(45) Date of Patent: *Feb. 4, 2020

(54) SYSTEMS AND METHODS FOR BIOMETRIC IDENTIFICATION

(75) Inventors: Mark Anthony Walch, Chantilly, VA (US); Donald T. Gantz, Fairfax, VA (US); Daniel Thomas Gantz, Arlington, VA (US)

(73) Assignee: SCIOMETRICS, LLC, Chantilly, VA (US)

( * ) Notice: Subject to any disclaimer, the term of this patent is extended or adjusted under 35 U.S.C. 154(b) by 615 days.

This patent is subject to a terminal disclaimer.

(21) Appl. No.: 13/983,558

(22) PCT Filed: Feb. 6, 2012

(86) PCT No.: PCT/US2012/024034
§ 371 (c)(1),
(2), (4) Date: Apr. 4, 2017

(87) PCT Pub. No.: WO2012/106728
PCT Pub. Date: Aug. 9, 2012

(65) Prior Publication Data
US 2017/0243042 A1 Aug. 24, 2017

Related U.S. Application Data

(60) Provisional application No. 61/468,336, filed on Mar. 28, 2011, provisional application No. 61/439,802, filed on Feb. 4, 2011.

(51) Int. Cl.
*G06K 9/00* (2006.01)
(52) U.S. Cl.
CPC ......... *G06K 9/001* (2013.01); *G06K 9/00026* (2013.01)

(58) Field of Classification Search
CPC .. G06K 9/001; G06K 9/00026; G06K 9/6204; G06K 9/00892; G06K 9/469;
(Continued)

(56) References Cited

U.S. PATENT DOCUMENTS 6,757,415 B1 *   6/2004   Rogers ................. G06K 9/4609
                                                        382/130
2006/0256115 A1 *  11/2006   Cao ......................... G06T 11/20
                                                        345/442

(Continued)

OTHER PUBLICATIONS

Huaqiang, Yuan et al. "A fingerprint feature extraction algorithm based on curvature of Bezier curve" Progress in Natural Science, vol. 17, No. 11, pp. 1376-1381, year 2007.*

(Continued)

*Primary Examiner* — Samir A Ahmed
(74) *Attorney, Agent, or Firm* — Procopio, Cory, Hargreaves & Savitch LLP

(57) ABSTRACT

Embodiments of an automated method of processing fingerprint images, identity information is extracted from prints typically classified as having "no identification value" because of sparse or missing minutiae by capturing ridge contour information. Bezier approximations of ridge curvature are used as Ridge Specific Markers. Control points arising from Bezier curves generate unique polygons that represent the actual curve in the fingerprint. The Bezier-based descriptors are then grouped together and compared to corresponding reference print Ridge Specific Marker data. The method makes it possible to fuse a plurality of individual latent print portions into a single descriptor of identity and use the resulting data for comparison and identification. Processing of poor quality reference prints according to the methods disclosed renders these prints useable for reference purposes.

16 Claims, 27 Drawing Sheets

(58) Field of Classification Search
CPC ........... G06K 9/00006; G06K 9/00067; G06K 9/00073; G06K 9/0008; G06K 9/00087; G06K 9/00093
USPC .................................................. 382/124, 125
See application file for complete search history.

(56) References Cited

U.S. PATENT DOCUMENTS

| | | | | |
|---|---|---|---|---|
| 2008/0249588 A1* | 10/2008 | Greenberg | ........... | A61N 1/0543 607/54 |
| 2009/0175505 A1* | 7/2009 | Muquit | .............. | G06K 9/00006 382/115 |
| 2010/0239128 A1* | 9/2010 | Mohammad | ....... | G06K 9/00067 382/115 |
| 2011/0090541 A1* | 4/2011 | Harper | .................... | G06F 21/32 358/474 |

OTHER PUBLICATIONS

Perumal, Vani et al. "An Innovative Scheme for Efficient Fingerprint Data Compression Using Bezier Curve Representations", International Journal of Computer Science and Information Security, Vo. 6, No. 1, pp. 149-157, year 2009.*

Isenor, D. K. et al. ("Fingerprint Identification Using Graph Matching", Pattern Recognition, vol. 19, No. 2, pp. 113-122, year 1986.*

* cited by examiner a.              b.

a.    b.    c.
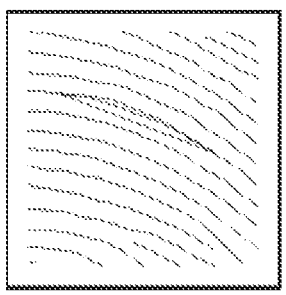 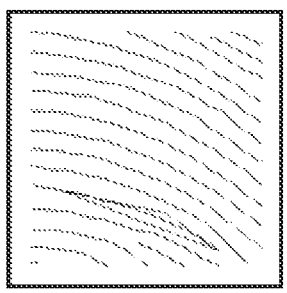 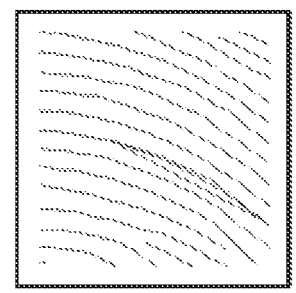
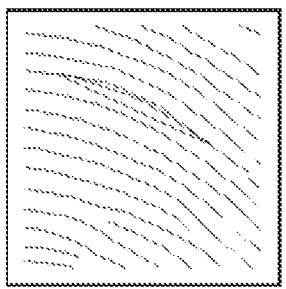 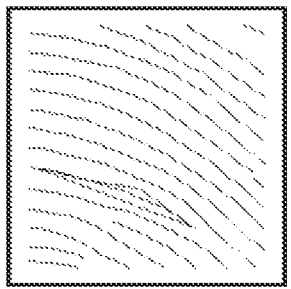 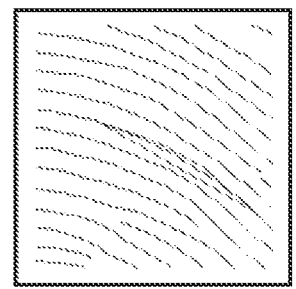
d.    e.    f.
Fig. 6

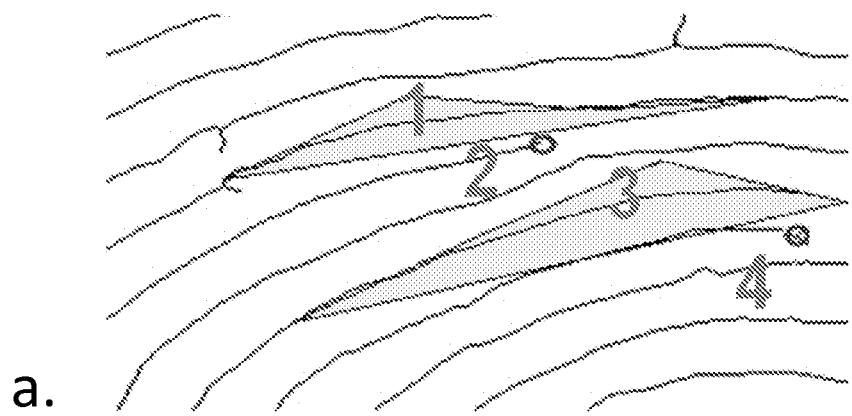
a.
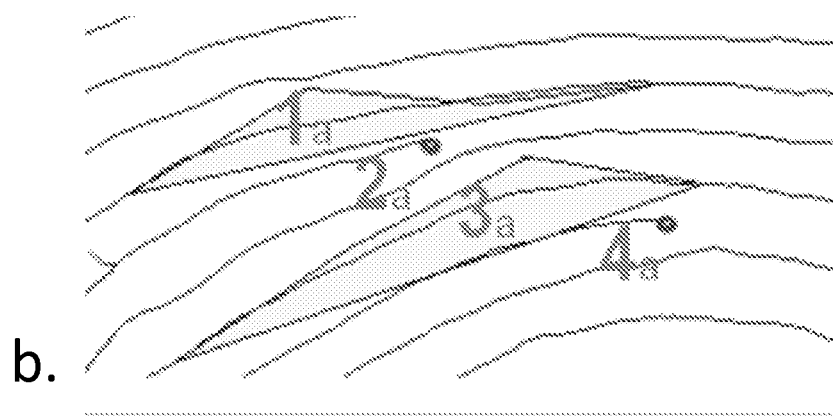
b.
Fig. 7
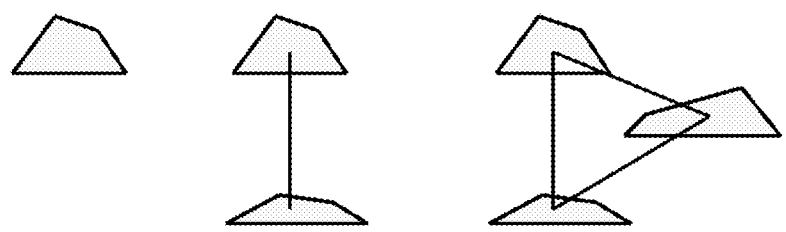
a.      b.      c.
Fig. 8

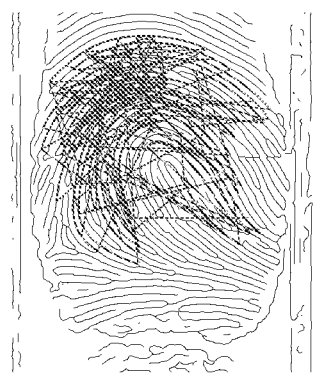 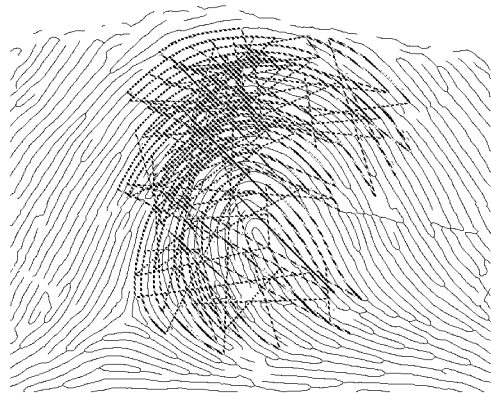
a.     Fig. 9     b.
a.                        b.
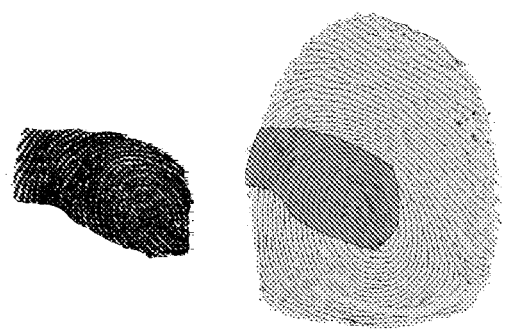 
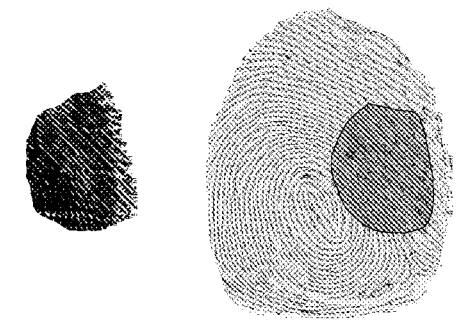 
c.                        d.
Fig. 10

Fig. 14 a.  b. 
Fig. 15 a.  b. 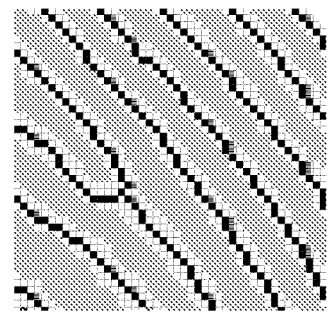

b. 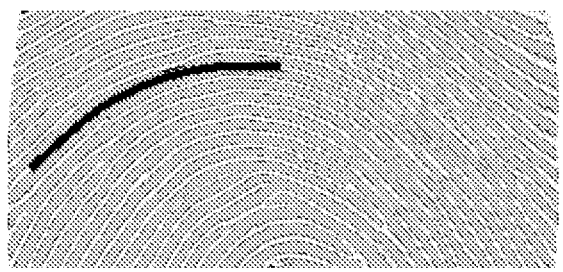
c. 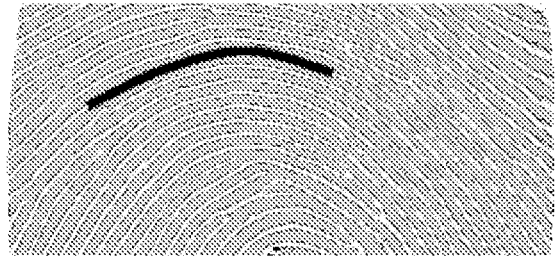

Fig. 22
a.
b.
Fig. 23
Fig. 24

a.  b.

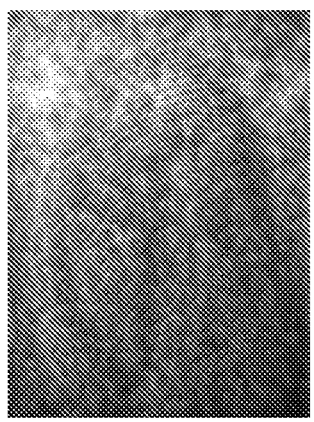
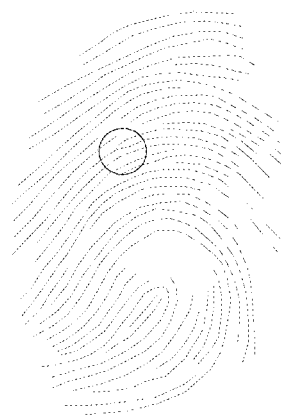
a.           b.
Fig. 30
a.
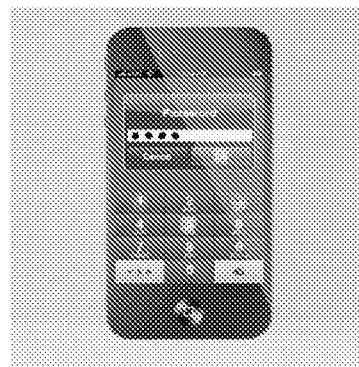
b.
c.

a.
b.
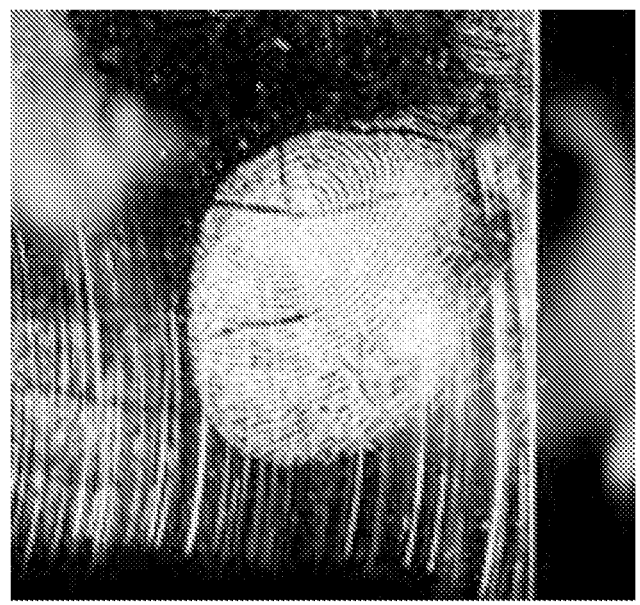
c.
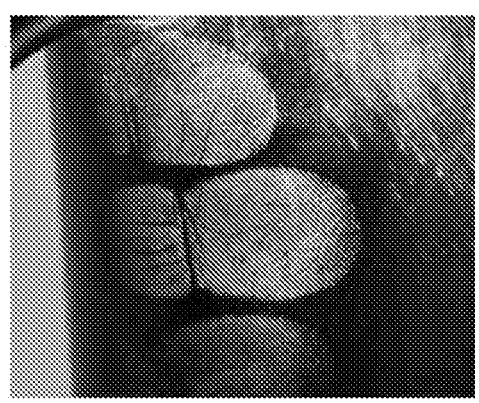
Fig. 32

Fig. 33
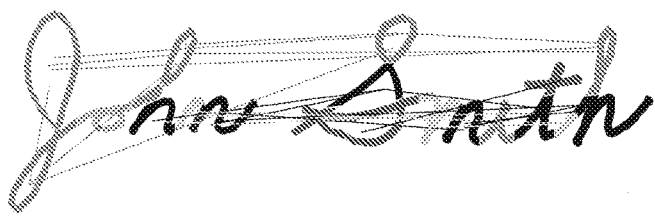
Fig. 34A
Fig. 34B

| Intell Type | Media | Biometric | Match% | |
|---|---|---|---|---|
| Forensic | Doc found @ hot site | Handwriting | 80.0% | — 4210a |
| | | Latent # 1 | 70.0% | — 4210b |
| | | Latent # 2 | 80.0% | — 2410c |
| | | Latent # 3 | 90.0% | — 4210d |
| SIGINT | Cell call from site | Voice | 95.0% | — 4210e |
| VISINT | Video @ Airport | | 80.0% | — 4210f |
| | Photo - Plaza near site | | 75.0% | — 4210g |
| | | Fused Probability | 99.7% | — 4220 |

SYSTEMS AND METHODS FOR BIOMETRIC IDENTIFICATION

This application claims the benefit of U.S. Provisional Patent Application Ser. No. 61/439,802 filed Feb. 4, 2011 titled "Multimodal Fused Biometrics On Portable Devices For Virtual And Physical Access" and U.S. Provisional Patent Application Ser. No. 61/468,336 filed Mar. 28, 2011 titled "An Approach for Recovering Latent Fingerprints from Paper Documents Without Chemical Treatment." For purposes of the U.S. National Phase, this application further claims priority of co-pending U.S. patent application Ser. No. 12/611,893, publication number US 2010/0189316 A1, filed Nov. 3, 2009. The entire disclosures of each of these prior applications are incorporated herein by reference.

TECHNICAL FIELD

The present invention is directed generally to the field of identifying persons using fingerprints and/or other biometrics.

BACKGROUND ART

As the breadth of biometric identification implementations grow across a variety of sectors, fingerprints continue to be a critical source for establishing identity. Latent prints are prints that remain after an individual has left the scene where the prints are found. Tenprint is a term of art describing a complete set of prints that is intentionally captured using ink on fingerprint cards, a live scanner or similar methods where the individual is present as the prints are obtained. The term tenprint is used herein to refer generally to a reference prints or prints, whether or not it comprises a complete print, a partial print or set of prints, and the term latent print is used to refer generally to a print that is to be compared to a reference print or prints.

Many latent fingerprints do not provide a practical basis for identification using conventional approaches. Matching latent prints with corresponding exemplars requires highly skilled human expertise. Under current practice, Latent Fingerprint Examiners determine that many prints have no identification value due to the limited quantity and quality of their friction ridge information. This class of prints with insufficient "minutiae" to support identification is referenced as NIV (No identification Value) latent prints. The automated matching of partial latent prints against reference prints is often, with conventional methods, an unsolved problem. Conventional fingerprint searching requires that a latent print contain a sufficient number of minutiae (ridge bifurcations and terminations) to support searching. Without enough minutiae, searching cannot be performed. Thus, the inventors have determined that there is a need for an automated method that can work with information presented within latent prints beyond traditional minutiae.

Paper-bound prints represent one of the most challenging aspects of the general latent fingerprint problem because the paper absorbs the oils and amino acids that comprise the print. The result is a print that is very difficult to capture as an image coupled with an image that is to "coarse" for processing by Automated Fingerprint Identification Systems (AFIS) technology.

Paper documents provide a wealth of information related to identity. If the documents are handwritten or bear a signature, the identity of the writer can be discovered through the individualistic characteristics within the handwriting. Another major source of identity takes the form of fingerprints. The longstanding problem with extracting fingerprints from paper documents has been that the methods needed to reveal the fingerprints are destructive to the document. The problem is further compounded by the fact that fingerprints extracted from paper documents tend to be of low quality due to the textured nature of the background paper.

Furthermore, isolating prints on paper documents is time consuming process requiring technical expertise both in the capture of prints and extracting the minutiae information from the prints necessary to perform an automated search against a fingerprint database.

Using prior art methods, a fingerprint is "developed" from underlying paper. This process requires chemical treatment of the paper and takes several minutes to perform for a single page. The result is damage to the underlying document. Furthermore, an expert is required to identify the minutiae within the print that can be used as the basis for an automated search. The quality of fingerprints extracted from paper is often much poorer than those captured directly from fingers. The inventors have determined that there is a need for an improved method of processing fingerprints on paper items and using them for identification.

The discussion of prints on paper provided herein is but an example of an entire class of latent fingerprints that lacks sufficient information to be identified automatically by conventional minutiae-based methods. Other examples include latent prints where the surface contact area is extremely small leaving only a small fraction of the finger surface as the actual print; prints deposited on three dimensional surfaces such as pencils and cups; prints where information is missing due to deterioration or, in the case of tenprints captured in ink on fingerprint cards, image distortion due to too much or too little ink; and parts of the finger such as sides and fingertips which can also deposit prints with limited minutiae displayed. Finally, the advent of small portable devices such as smart phones creates an opportunity to use fingerprints as a means of establishing user identity for security purposes and to structure a "user experience" that best reflects individual preferences. To make such a capability fit within the "usual and customary" use of the device and without requiring an overt action by the user to provide a fingerprint specimen, it will be necessary to capture areas of the print such as the fingertips, sides and/or small surface fragments that have sufficient information to identify the user.

The inventors have developed new systems and methods that address these and other needs and issues in the industry.

DISCLOSURE OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In example embodiments, automated systems and methods of processing fingerprint images are provided wherein identity information is extracted from prints typically classified as having "no identification value" because of sparse or missing minutiae by capturing ridge contour information. In preferred embodiments, Bezier approximations of ridge curvature are used as Ridge Specific Markers. Control points arising from Bezier curves generate unique polygons that represent the actual curve in the fingerprint. In an embodiment, Bezier-based descriptors are grouped together and compared to corresponding reference print Ridge Specific Marker data.

The analytical methods and systems disclosed can be applied, in an example embodiment, in a portable device such as a cell phone to provide various forms of access (e.g., cyber or physical access). The device may incorporate multiple biometrics as a means of access control. Together, the device and biometrics provide a portable means for individuals to authenticate their identity with a high degree of security.

When applied to latent prints, the disclosed embodiments enable useful processing of multiple latent fingerprint samples from a single or multiple sources by extracting available information from the poor quality images, and then fusing this information into a composite mosaic. In an embodiment, a ridge-centric graphically based analysis is then applied to the composite data to provide identification.

When applied to tenprints, the methods disclosed make prints available for comparisons that are currently not useable due to poor inking or other process failures when taking the print.

BRIEF DESCRIPTION OF DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

FIGS. 6a through 6c show Bezier polygons identified in ridge zones for a first example finger, and FIGS. 6d through 6f show Bezier polygons in ridge zones for a second example finger;

FIGS. 7a and 7b illustrate a comparison of multiple Bezier-based features across prints;

FIG. 8a through 8c are examples of graphs constructed from Ridge Specific Markers according to an example embodiment;

FIG. 9a illustrates a mapping of ridge relationships in a latent print and FIG. 9b shows corresponding relationships in a full reference print corresponding to the latent print of FIG. 9 a;

FIG. 10 shows an example of four latent fragments identified as matching a tenprint, according to an example embodiment;

FIG. 14a is an example of a fingerprint specimen and FIG. 14b is an example of a high-contrast representation of the fingerprint of FIG. 14 a;

FIG. 15a is a fingerprint image and FIG. 15b is example of skeleton output corresponding to a portion of FIG. 15 a;

FIG. 22a shows a reference print with a latent Bezier curve and FIG. 22b shows ten Bezier curve clusters associated with the reference print;

FIG. 23 is a depiction of the best-fitting Bezier curves relative to the clusters of FIG. 22 b;

FIG. 24 illustrates a close-matching 3-tuple;

FIG. 28a is a graph from a latent fingerprint, and FIG. 28b is a graph from a reference fingerprint that matches FIG. 28 a;

FIG. 30a is an image of a fingerprint captured from a paper document in a non-destructive process, and FIG. 30b is a representation of visible features captured from a paper-based fingerprint;

FIGS. 32a, 32b, and 32c are photographs of fingerprint image remnants on multiple locations that can be combined for analysis in a disclosed embodiment;

FIG. 33 illustrates examples of graphemes in handwritten Arabic characters;

FIG. 34A illustrates an example signature specimen;

FIG. 34B illustrates an example grapheme decomposition and relationship chart for the signature specimen in FIG. 34A, according to an embodiment;

BEST MODE FOR CARRYING OUT THE INVENTION

Figure 1A:
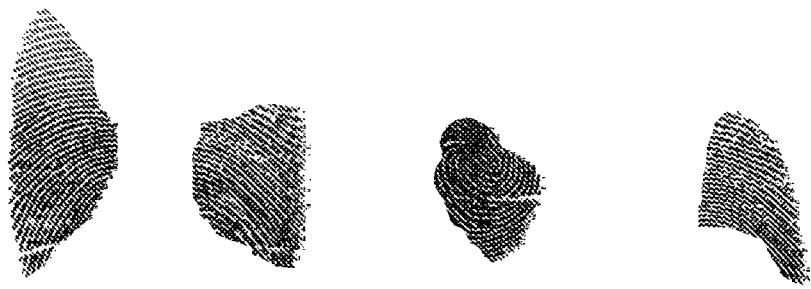
FIG. 1 is an example image of latent print remnants and tenprint portions.

The present invention will be described in terms of one or more examples, with reference to the accompanying drawings. In the drawings, some like reference numbers indicate identical or functionally similar elements. Additionally, the left-most digit(s) of most reference numbers may identify the drawing in which the reference numbers first appear.

The present invention will be explained in terms of exemplary embodiments. This specification discloses one or more embodiments that incorporate the features of this invention. The disclosure herein will provide examples of embodiments, including examples of data analysis from which those skilled in the art will appreciate various novel approaches and features developed by the inventors. These various novel approaches and features, as they may appear herein, may be used individually, or in combination with each other as desired.

In particular, the embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may implement such feature, structure, or characteristic in connection with other embodiments, whether or not explicitly described.

Embodiments of the invention may be implemented in hardware, firmware, software, or any combination thereof, or may be implemented without automated computing equipment. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in handheld computers, PDAs, mobile telephones, and other portable devices; magnetic disk storage media; optical storage media; thumb drives and other flash memory devices; electrical, optical, acoustical, or other forms of propagated signals (e.g. carrier waves, infrared signals, digital signals, analog signals, etc.), and others.

Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

In the biometric field, the term "identification" is sometimes used to mean a process where an individual identity is determined by a one-to-many database search. The term "verification" is sometimes used to refer to a process of one-to-one matching. In this specification, each of the terms "identification" and "verification" are intended to encompass both possibilities. For example, when the term "identification" is used, it should be understood that this term may refer to identification and/or verification, and when the term "verification" is used, it should be understood that identification may be included within the scope of verification.

Advantages of certain embodiments of the novel methods and processes described herein include, among other things, the ability to extract identity information from prints typically classified as having "no identification value" because of sparse or missing minutiae by capturing ridge information, the ability to fuse several individual latent print remnants into a single descriptor of identity, and the ability to render poor quality tenprints useable for reference purposes.

Figure 1B:

FIG. 1a shows examples of latent fingerprint remnants from the same thumb. FIG. 1b is a complete fingerprint image of the subject thumb. Using conventional minutiae-based methods, it is impossible to match the latent print remnants of FIG. 1a against the image stored from a tenprint in FIG. 1b. However, the inventor has discovered that these latent prints become valuable sources of identity when a ridge-centric identification method is applied in conjunction with the inventive fusion process described herein.

Figure 2:
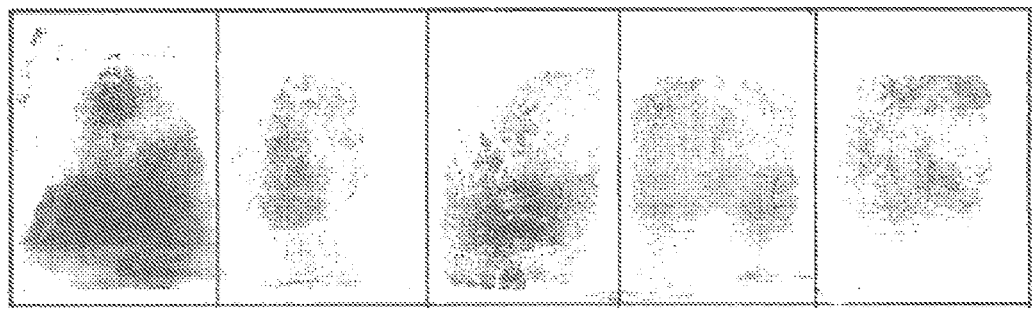
FIG. 2 is an example image of a tenprint for multiple fingers where the images are not useable because of poor ink quality.

FIG. 2 is an example image of a portion of a tenprint where the images of multiple fingers are not useable because of poor ink quality.

Figure 3:
FIG. 3a is an example fingerprint from a tenprint with over-inked zones.
FIG. 3b shows the image of FIG. 3a where portions of the print that do not contribute identification information have been masked.

FIG. 3a shows a fingerprint from a tenprint with over-inked zones that have no useful information. The remainder of the print, however, can provide a basis for identification in the context of the current invention. The image in FIG. 3b shows masking applied to the portions of the print that are over-inked and thus invalid for identification purposes.

Even in the absence of traditional minutiae, however, the inventor has found that partial latent prints may present several good representations of friction ridges. These ridges offer an opportunity for automated extraction of information from partial latent prints. The term "Ridge Specific Markers" will be used to specify a ridge-associated feature that can be associated with a specific section of a ridge based on the geometric information available from the ridge. The inventors have determined that the concept of Ridge Specific Markers offers a potential innovation by using ridge geometry to create a new feature to supplement the missing bifurcations and ridge endings. Stable Ridge Specific Markers perform a function similar to the function of traditionally defined minutiae in conducting an identification process according to certain embodiments described herein.

Figure 4:
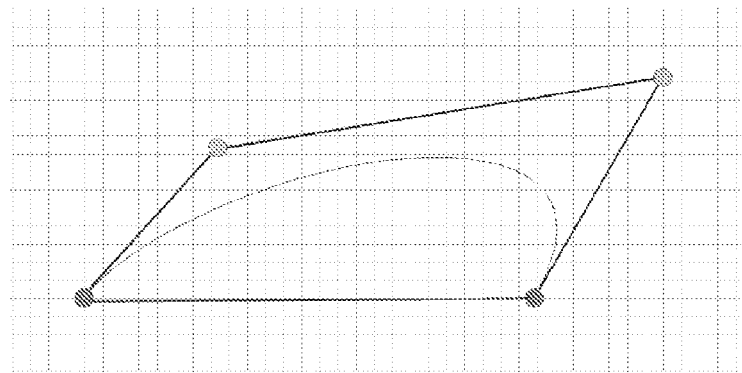
FIG. 4 is a graph showing a simple Bezier curve and associated polygon.

Bezier curves are a method of representing geometric paths, named after Pierre Bezier, a French mathematician and engineer who developed this method of drawing in the late 1960s while working for the automobile manufacturer Renault. Bezier curves are the cornerstone of Computer Aided Design methods used for architectural and engineering design as well for scalable fonts used in desktop publishing. The most basic Bezier curve consists of two end points and two control points. FIG. 4 shows a simple Bezier curve and its four related points. Manipulating these defining points can alter the curve. Bezier values offer a way of describing curves that is both compact and accurate. The four "Bezier points" (two end points and two control points") replace the entire set of Cartesian plot points that would otherwise be necessary for curve representation.

In an embodiment, Bezier-based curve descriptors are used to specify Ridge Specific Markers as follows. A Bezier curve is a smooth, mathematically defined curve and can thus approximate the path of a curved object such as a fingerprint ridge. An advantage of a Bezier curve in the context of the present process is that its mathematical form can be expressed by defining a small number of control points. Bezier relationships can be effective in identifying similar curves because the relationship among the points is derived from the curve. Because they can be precisely fitted into the curvature of ridges, Bezier descriptors can be used to "mark" positions on the ridges creating a new form of "minutiae" where traditional minutiae are scarce or even non-existent.

Connecting the four Bezier descriptors of a curve defines a polygon. The relationships among the corner points within this polygon can be expressed as data elements that can be compared directly. FIG. 4 also shows the Bezier-based polygon (quadrilateral) associated with the Bezier curve.

The angles and distances define a unique representation of the polygon. This, the polygon becomes a unique marker for a particular curve segment. As will be seen, in disclosed embodiments the Bezier curves are applied to provide a means of imputing "minutiae" where traditional minutiae do not exist.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Figure 5:
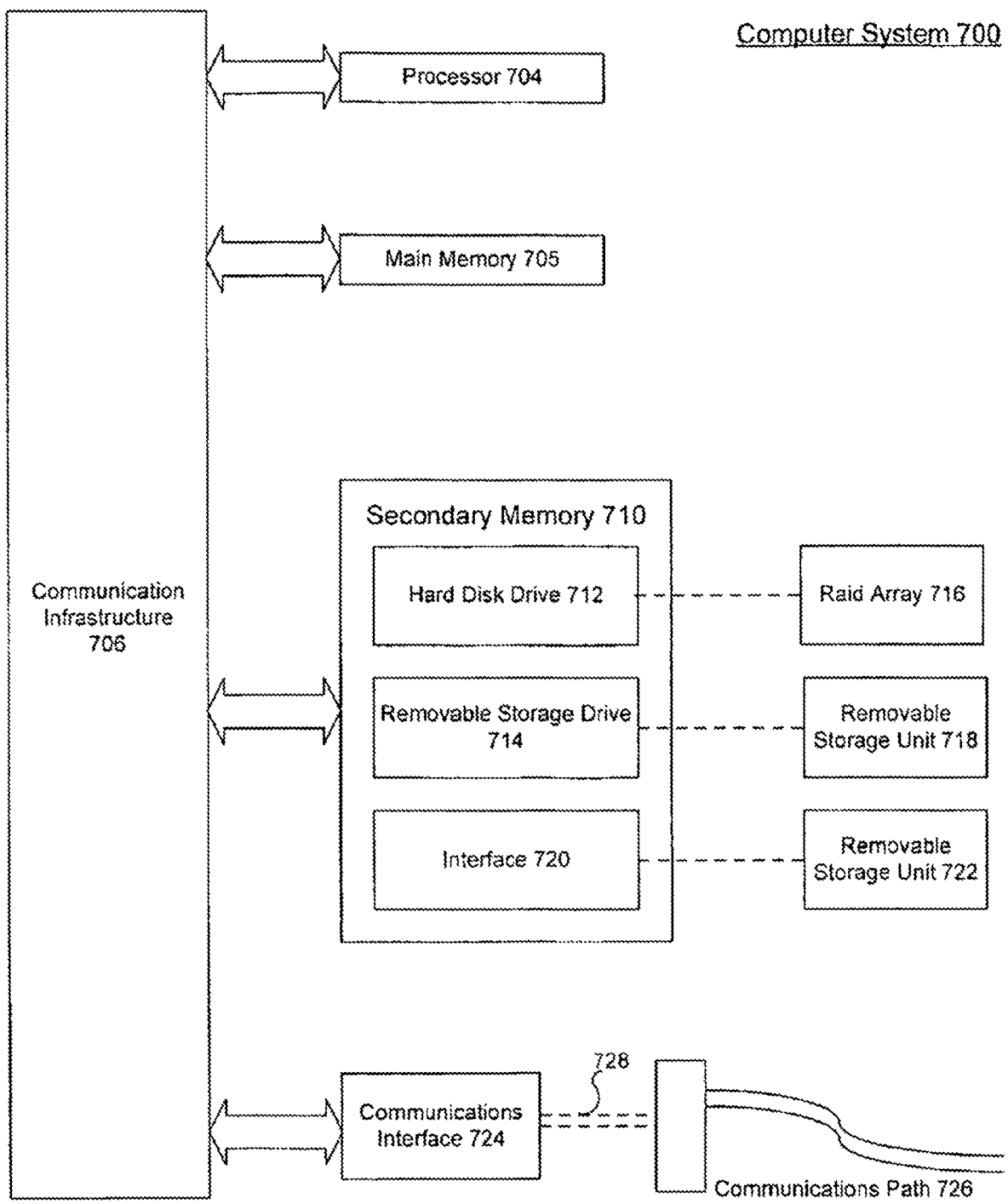
FIG. 5 is a block schematic diagram of an exemplary computer hardware system used in some example embodiments to implement the processes disclosed herein.

FIG. 5 is a block schematic diagram of an example embodiment of a computing system on which the disclosed analysis can be performed. The example embodiment shows a general-purpose computer system 700, such as a PC system. In particular, the methods disclosed herein can be performed manually, implemented in hardware, or implemented as a combination of software and hardware. Consequently, desired features of the invention may be implemented in the environment of a computer system or other processing system. The computer system 700 includes one or more processors, such as processor 704. Processor 704 can be a special purpose or a general-purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, solid state memory, USB port for a thumb drive, PC card slot, SD card slot for a flash memory, etc. The removable storage drive 714 reads from and/or writes to a removable storage unit 718 in a well-known manner. Removable storage unit 718, represents a floppy disk, magnetic tape, magnetic drive, optical disk, thumb drive, flash memory device, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet interface), a communications port, a wireless network communications device such as an IEEE 802.11x wireless Ethernet device, 3G or 4G cellular data connection, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other present or future available communications channels.

The terms "computer program medium" and "computer usable medium" are used herein to generally refer to all available types of digital media, for example, removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed by the processor 704, enable the computer system 700 to implement the present invention as discussed herein. In particular, the computer programs, when executed, enable the processor 704 to implement the processes of the present invention. Where the invention is implemented using software, the software may be provided as a computer program product on media or transmitted digitally via one of the network connections available to computer system 700, and loaded into computer system 700, for example on raid array 716, removable storage drive 714, hard drive 712 or communications interface 724.

As shown in FIGS. 6a through 6f, Bezier polygons define unique features in places where bifurcations and terminations may not exist or are sparse.

Multiple Bezier polygons can be combined into a single set of features useable for latent-to-reference print matching. FIG. 7a shows a latent print that has been processed to associate Bezier polygons with the features present in the print. FIG. 7b is a corresponding reference print processed to associate Bezier polygons with its features. FIGS. 7a and 7b also illustrates how Bezier features can be used either with or without traditional minutiae to expand the field of potential "minutiae" that can be used for fingerprint matching. In this example, features 4 (and 4a) represent a conventional minutiae feature, specifically a ridge termination. Features 1, 2, and 3 in FIG. 7a, corresponding to Features 1a, 2a and 3a in FIG. 7b, are Bezier-based Ridge Specific Markers. It should be noted that Bezier polygons and a selected set of reference points within the actual curve can be used interchangeably for computational purposes in the present invention.

The Ridge Specific Markers create "anchor points" from which graph-based recognition processes can be applied to fingerprints. A detailed discussion of graph-base recognition is provided in U.S. Pat. No. 7,724,956, the disclosure of which is incorporated herein by reference. The Bezier polygons serve as a building block for graphs. In an embodiment, the centroids of the polygons become the "vertices" of the graph. The "edges" for these graphs take the form both of actual ridgelines as well as connectors between the Ridge Specific Markers. In an embodiment, graphs are built from multiple combinations of Ridge Specific Markers. FIG. 8a shows an example of a graph with a single polygon, FIG. 8b shows an example with paired polygons, and FIG. 8c shows an example with triplet polygons.

An example embodiment presented herein uses a pairwise graph as a comparative structure, however, those skilled in the art will understand that any number of polygons can be selected within the scope of the invention. For example, the number of polygons used to build the graph may be any desired number determined through experimentation, and may be larger than two or three. Whereas specific comparisons can be made between specific ridges either through direct comparison or through comparison of polygon representations and these comparisons in their own right provide significant identification power, graphs can be used to describe the overall relationships among the ridges to further expand this identification power.

The power of the Ridge Specific Markers incorporating the Bezier Polygon feature is illustrated through a latent and comparator prints example. FIGS. 9a and 9b show a latent and reference print, respectively, for a right thumb. A similar comparison could also be made using points on the curve directly.

FIG. 9a shows a latent print from the same thumb that produced the full reference print shown in FIG. 9b. In an embodiment, a Ridge Specific Marker process is applied to identify common ridges between the same prints.

In an embodiment, latent print identification is performed through a multiple step process that ingests images of latent prints and produces a ranked list of identities. The ranking in this list reflects the strength of the match between the latent print and the corresponding reference. It should be noted that for purposes of this invention, "reference prints" may refer either to tenprints, partial sets of reference prints, or other latent prints.

Figure 11A:
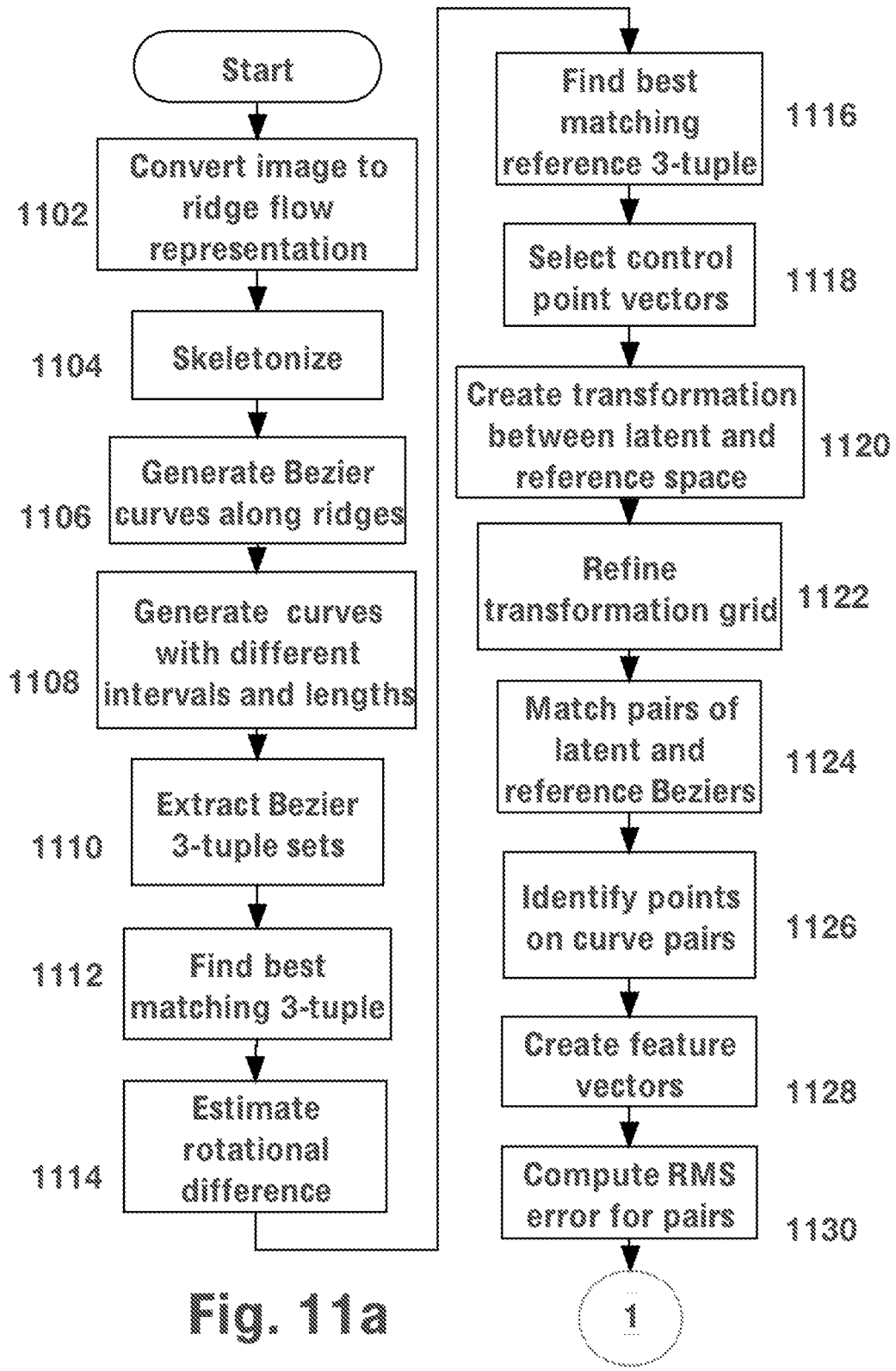
FIGS. 11a and 11b together constitute a flow chart for an example embodiment of an overall process for comparing partial latent fingerprint images to reference prints.
Figure 11B:
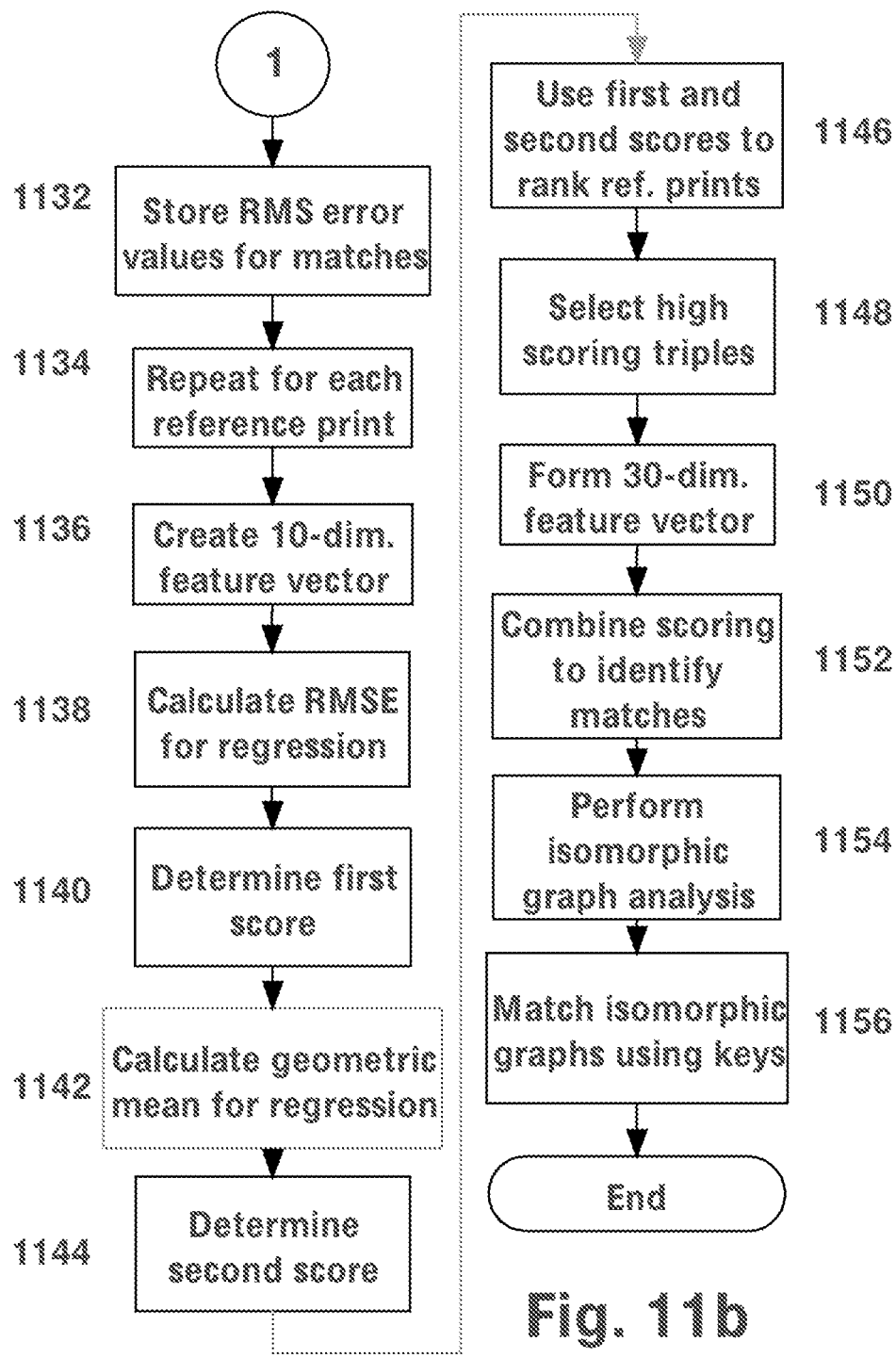

FIGS. 11a and 11b together comprise a flow chart showing one example embodiment of a method for processing individual latent fragment and comparing them against a collection of references. Referring to FIG. 11a, in step 1102, the fingerprint image is converted into a high-contrast representation of ridge flow. Step 1102 is preferably performed according to the process shown in the flow chart of FIG. 12.

Figure 12:
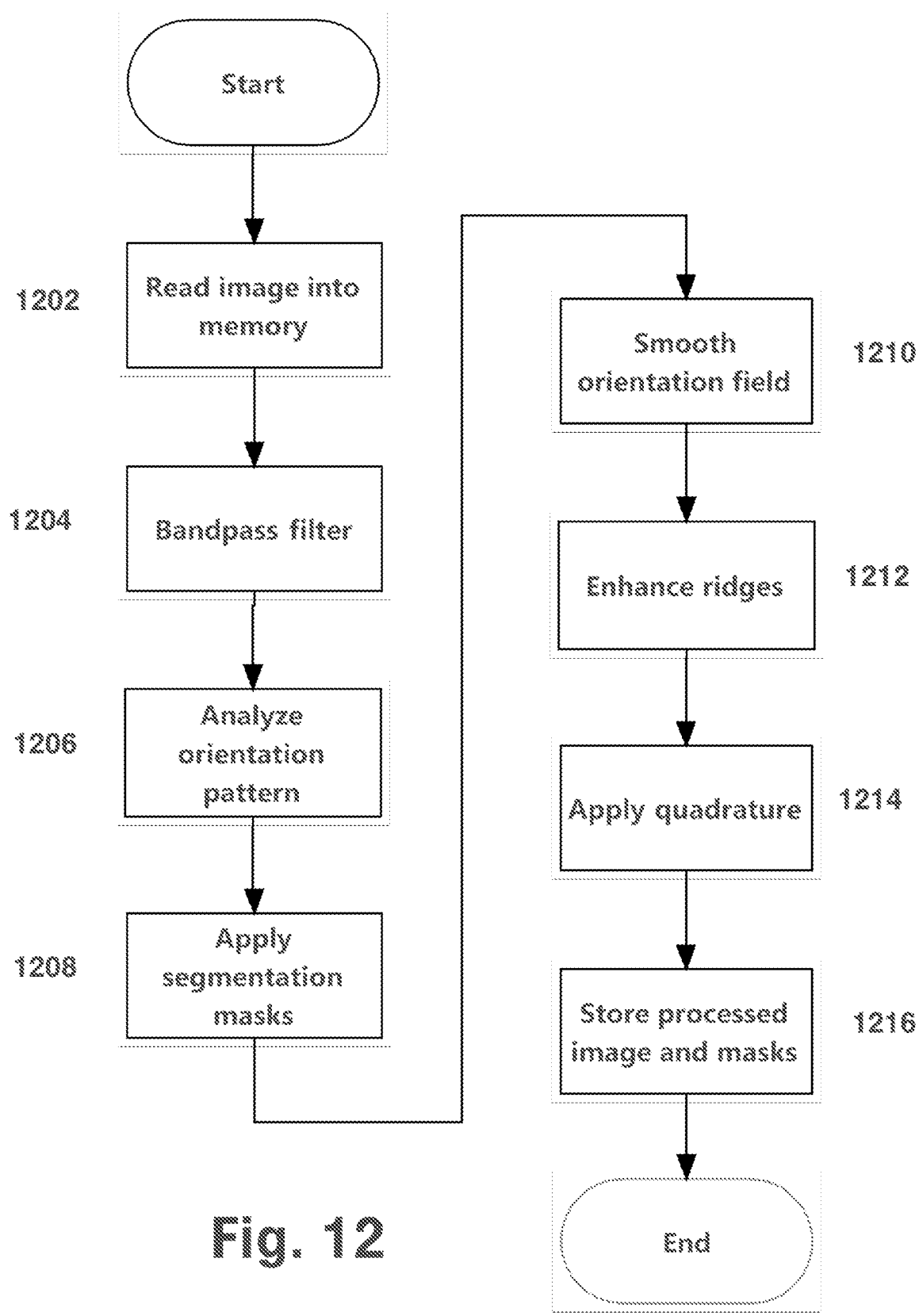
FIG. 12 is a flow chart showing an example embodiment of image processing steps used in the processes shown in FIGS. 11a and 11b and FIG. 13.

Referring to FIG. 12, in this example embodiment the conversion is performed as follows. A fingerprint pattern may be idealized as a wavelike pattern of periodic ridges. That is, over a limited region of the image, the pattern may be expressed as a sinusoidal wave function, plus some offset value. The wave frequency and amplitude, as well as the offset value, are constant over a limited region of the image, though they are likely to vary from one region of the image to another. It is not expected that the image brightness will actually follow a sinusoidal function; the point is that representation of the pattern by such a function captures the essentialfeature of the pattern, namely the positions of lines of maximum and minimum intensity. In a standard fingerprint, rking is done with dark ink on a lighter background; the lines of intensity minimum therefore correspond to the axes of the ridges, while the maxima correspond to the axes of the valleys between the ridges.

Several researchers have developed representations of the fingerprint as a wave pattern. This task is complicated by two factors: the presence in the flow pattern of core and delta points, at which the ridge orientation is undefined; and the existence of the minutiae, which are the points at which ridges bifurcate or terminate. There are ways to handle such features in a wave phase representation. Therefore, in an embodiment, rather than representing the print as a wave pattern, the processing method generates a normalized representation in which the points on the ridge axes have the value −1, the points on the inter-ridge axes have the value +1, and intermediate points have intermediate values. The result is a clear uniform image of the ridges.

Real fingerprint images are subject to a number of corrupting influences that cause the image to differ from a simple periodic ridge pattern. These include: image noise introduced by the image capture process itself, variations in thickness of the ink or other marking medium causing the darkness of the ridges to be non-uniform, variation in the brightness of the background, and irregularity in the ridges themselves including wiggles and transient features such as spurs and breaks. Strictly speaking, these are not noise, inasmuch as they reflect what is actually present on the fingertip. However, they are extraneous to the ridge pattern so it is desirable to eliminate these irregularities during image processing.

In the embodiment of FIG. 12, the processing comprises reducing or eliminating these various kinds of noise, then normalizing the result so that the image values range from −1 (ridge axes) to +1 (valley axes).

An important secondary function of the processing is segmentation of the print. This refers to separation of the image into foreground (print) and background, each point in the image being assigned to one or the other. The foreground is defined as the part of the image in which the ridge pattern can be retrieved. A point may be labeled as background for one of two reasons; it may be outside the area contacted by the fingertip, or it may be within the area, but the ridge pattern may be too unclear to delineate it with confidence. Foreground and background points are labeled with the values 1 and 0 respectively.

As shown in FIG. 12, the process of converting an image into a high-contrast representation of ridge flow begins with step 1202, where the image is read into memory from the user-specified file. If it is not a grayscale image, it is preferably converted to a grayscale data format.

In step 1204, a bandpass filter is applied. This is a filter that eliminates all frequency components of the image, except those lying within a specified range. This exploits the fact that ridges on human fingers tend to have a spacing that does not vary a great deal from 0.5 mm; the frequency range cutoff values allow for a variation either side of this value by a fairly generous factor of two. (Clearly, therefore, it is necessary to know the image resolution, in order to convert this average ridge wavelength into a width expressed as a number of pixels.) One effect of the bandpass filter is to eliminate the zero-frequency component, or "DC component"; this makes the mean intensity value equal to zero over any extended area of the image, which is part of the requirement for a normalized representation.

In step 1206, the orientation pattern of the ridges is analyzed. This step retrieves a number of quantities, including the orientation of the ridge pattern at each point. Another quantity determined in the example embodiment is coherence, Coherence is represented by a number between 0 and 1, and is a measure of how well defined the orientation pattern is at each point. A value of 1 corresponds to the optimum situation, where all the intensity variation in the image is in one direction (perpendicular to the ridges), with no variation in the direction parallel to the ridges. A value of 0 indicates no preference for one direction over another, as would occur in a region of uniform brightness or with random image noise that was not directionally dependent.

The ridge orientation field, along with other relevant parameters such as coherence, is obtained by a method that will be referred to as Principal Component Analysis. This process identifies the direction at each point in the image in which the intensity variation per unit is greatest; in a ridge pattern this is typically perpendicular to the ridges. Because the intensity gradient along any direction, which is the measure of the variation, may be positive or negative, the square of the intensity gradient is used. In particular, at each point the direction is identified for which the squared intensity gradient, taken along this direction and averaged over the neighborhood of the point, is a maximum. Best results are obtained if the radius of the neighborhood is about equal to the average ridge wavelength; using a smaller neighborhood results in oversensitivity to image noise, while too large a radius "smoothes out" the orientation field too much, and may result in inaccurate placement of the cores and deltas.

The direction $\Theta$ of maximal squared intensity gradient is given by:

$$2\Theta = \arctan(P/D)$$

where $$D = \mathrm{mean}(g_x^2 - g_y^2)$$

$$P = \mathrm{mean}(2 g_x g_y)$$

and $g_x$ and $g_y$ are the image intensity gradients in the x and y directions respectively.

There are two values of $\Theta$ (180 degrees apart) that satisfy this equation. This reflects the fact that orientation is an ambiguous quantity; a road on a map is designated as running east to west, but traffic on that road may be traveling either east or west.

Two other quantities are extracted at this stage. These are:

$$R = \sqrt{(D^2 + P^2)}$$

$$E = \mathrm{mean}(g_x^2 + g_y^2)$$

Both these quantities are always non-negative. The energy E is a measure of the total image variation without reference to direction, while R, the directional response, measures the total directionally dependent image variation. R is zero when the pattern is completely isotropic, i.e. when the average amount of variation is the same no matter which direction one moves within the image; it is equal to E when all the variation is along one direction, as for example in the case of a set of perfectly parallel lines. The quantity C=R/E therefore always lies between 0 and 1, and may be used as a measure of the pattern's coherence, or how well the orientation of the pattern is defined. Very low coherence values occur in areas where the fingerprint is smudged or otherwise corrupted, as well as in most parts of the background; C is therefore one quantity that is useful in separating the print foreground from the background.

The quantities obtained in this analysis stage are used in the later noise removal stages, and they also provide important cues when performing segmentation.

Next, in step 1208, segmentation is performed by applying a series of segmentation masks. A segmentation mask is an image consisting of a set of binary values for all points in the image. Points assigned a value of 1 are denoted "foreground"; points assigned a value of zero are denoted "background".

In an embodiment, three different segmentation masks are generated, based on three different quantities. A coherence segmentation is generated by assigning a value of 1 to all points where the quantity C, defined above, is greater than a threshold value. The threshold may be selected by experimentation to correspond to characteristics of the image. A value of 0.3 is typical of a coherence value at which the ridge orientation is readily discernible.

In a preferred embodiment, this mask is modified to fill in holes occurring at a singularity in the flow pattern (a core or delta point). At these points, the coherence drops to a very low value. This is not because the ridges are poorly defined at this point, but because the orientation varies rapidly over a small region of space. This leaves "holes" in the mask at these points, the size of the hole being roughly equal to the radius of the neighborhood used in taking the means of gradient quantities to calculate D and P above. This operation is referred to as morphological closure.

The coherence segmentation is normally effective in including all the fingerprint regions where the pattern can be interpreted with the human eye, and it masks out most of the background. However there are certain types of background features that show high directional coherence, such as handwritten annotations, ruled lines on the card or the grain of the surface on which the print was made. Thus, in a preferred embodiment, the coherence mask is supplemented by additional masks.

In the example embodiment, a second mask based on directional response is generated based on the quantity R defined above. This quantity is a magnitude rather than a dimensionless quantity such as coherence; it measures the amount (in intensity per pixel displacement) by which the intensity varies in a directionally dependent manner. This mask eliminates background regions where the pattern is faint but highly linear. Many materials such as paper or wood exhibit a grain structure that is normally much fainter than the fingerprint ridges and may even not be discernible to the eye in the original image. This grain structure will result in high values for coherence, so that a coherence mask alone will erroneously include these areas as part of the foreground.

The directional response mask is generated by identifying all points where the quantity R is above a certain threshold. The threshold is selected based on the properties of the image, as follows.

The assumption is made that the fingerprint will occupy at least 5% of the image. Therefore, the quantity $R_m$ is found, such that only 5% of the points in the image have a value R R$_m$. If the foregoing assumption is valid, then this means that $R_m$ will be a value representative of points within the print foreground. Some foreground points will have a greater value of R; most will show a smaller value.

The threshold value $R_T$ is then set to $0.01*R_m$. This allows the mask to include regions where R is significantly less than the 95-percentile value. However it successfully masks out regions described above, namely parts of the background where there is a linear pattern corresponding to a very faint grain.

In this example embodiment, a third mask is generated based on the ridge frequency extracted from the pattern. First, a binary version of the enhanced image is generated by replacing all positive image values by 1 (white) and all negative values by 0 (black). Since the enhanced image is normalized, the values are symmetrical about zero, so the resulting binary image contains roughly the same number of on and off bits. Then, the borders of the black and white regions are identified. These are pixels whose binary value differs from the binary value of one or more of its neighbors. Next, since the direction of the ridge normal is already known, the number of on/off transitions per unit distance normal to the ridges is examined for each part of the image. The ridge frequency is half this value.

The mask is defined by selecting points for which the measured ridge frequency and the theoretical average frequency differ by less than a relative factor of 0.4. That is, if $f_m$ is the mean frequency, f will lie between $f_m/1,4$ and $1.4*f_m$.

The frequency mask shows holes similar to those in the coherence segmentation mask, and for the same reason; the core and delta points are points at which the orientation is ill-defined, therefore the frequency, measured along a particular direction, is also not well-defined. These holes are filled in using the same procedure as in the coherence mask.

The frequency-based segmentation filters out parts of the background containing features such as ruled lines or handwritten notes. Such patterns are highly linear, but they are typically isolated lines rather than a series of parallel lines such as is found in the ridge pattern.

The three segmentation masks described above are preferably combined into one final segmentation mask by an intersection operation. That is, a point is marked as foreground in the final mask if and only if it is a foreground point in all three individual masks.

In step 1210, the orientation field is smoothed. This reduces, and may eliminate, the effect of isolated linear features that are not associated with the ridges, such as skin folds, or handwritten lines drawn across the pattern.

An accurate prior determination of the orientation field is preferred, since knowing the orientation at each point allows the process to avoid smoothing out the pattern in the cross-ridge direction, which may eliminate ridge features of interest. For this reason, in an embodiment the process seeks to remove as much noise as possible from the derived orientation pattern before proceeding to the second stage.

The orientation, which is an angular measurement, can be smoothed by a method of averaging angles, for example: Express the angle as a vector quantity, e.g. a vector V with components Vx=cos(Θ) and Vy=sin(Θ). Vx and Vy are smoothed by taking a weighted mean over the image or a neighborhood within the image. The quantity is converted back to an angle by taking the angle defined by the smoothed components mean (Vx) and mean (Vy).

The example embodiment deals with two complications arising in the case of ridge orientation patterns. The first is that orientation is an ambiguous quantity, as noted above. An orientation of 30° is indistinguishable from an orientation of 150°. The example embodiment compensates for this factor by doubling the angle, then smoothing the doubled angle (which we denote Φ) by means of a weighted averaging, and finally halving the result.

The second complication is the core and delta points in the fingerprint. These represent singularities in the orientation field, and it is not practical or desirable to directly apply smoothing at these points. A simple smoothing generally has the effect of shifting the core or delta point to the wrong place.

A core point is characterized by the fact that, if a closed path is traced around the point and follow the behaviour of the orientation, this vector rotates by 180 degrees for a single clockwise traversal of the closed path. The doubled angle therefore rotates by 360 degrees. The same behavior happens at a delta point, except that the rotation is in the opposite sense. In other words, the cores and deltas can be treated as generating spirals in the orientation field, the spiral flows being superimposed on an otherwise continuous flow pattern. The doubled angle Φ over the image can be expressed as:

$$\Phi = \Phi_C + \Phi_S$$

where $\Phi_C$ is the residual field, and is $\Phi_S$ the spiral orientation field resulting from the presence of the cores and deltas.

At any point (x,y) in the image, the spiral field from a core point P is the bearing angle from the point (x,y) to the point P. This has the desired property that when any closed path is traced around P, the angle does one complete rotation.

Similarly the spiral field around a delta point is taken as the negative of the bearing angle. This gives the required rotation of the vector, in the opposite direction to the direction of the path traversal.

Core and delta points in the original Φ feld are located in the example embodiment using a quantity called the Poincare index. This is obtained using the spatial derivatives of the angle tier mathematical language, it is the curl of the x and y spatial derivatives of the angle), and its value is $2\pi$ at a core point, $-2\pi$ at a delta, and zero everywhere else.

In summary, in an example embodiment the orientation quantity is smoothed using the following steps:
1. Calculate the doubled angle Φ;
2. Locate the core points using the Poincare index;
3. Calculate the spiral field across the image for each core and delta point, and sum these to give $\Phi_S$;
4. Subtract $\Phi_S$ from Φ to give $\Phi_C$;
5. Smooth $\Phi_S$ using a weighted neighborhood average;
6. Add $\Phi_S$ back to the result to give a final smoothed field Φ with the core and delta points preserved.

In step 1212, ridge enhancement is performed. The ridge enhancement process is an image smoothing operation that smoothes intensity variations in the direction parallel to the ridges, while those in the perpendicular direction are largely unaffected. The example embodiment seeks to avoid smoothing in the cross-ridge direction, since this would eventually destroy the pattern of ridges and valleys, which are features of interest to be enhanced rather than diminished.

Ridge enhancement is a process for reducing or eliminating irregularities in the ridge pattern, making it conform more closely to a theoretically ideal ridge pattern. Ideally the pattern resembles a wave pattern with no breaks in the waves, with the crests and trough having the same amplitude everywhere. In this idealized ridge pattern the intensity is constant when one traces a path in the image parallel to the ridges.

In the example embodiment, noise consisting of small ntensity fluctuations in an image is reduced or eliminated by applying a suitably chosen smoothing filter, which replaces the intensity value at a pixel by a value calculated as a weighted average of pixels in a restricted neighborhood. A modified process is desirable to ensure that any smoothing takes place only in the direction parallel to the ridges, otherwise spatial averaging may reduce or eliminate the ridges themselves.

In an embodiment, a method described as oriented diffusion is employed. This exploits the fact that, if an intensity profile is taken along the direction of the ridge orientation, the humps and dips in the profile are related to the second spatial derivative of the intensity taken along that direction. This can be seen by considering the intensity I as a function f of spatial location x, and expressing f as a Taylor expansion centered on a reference value $x_0$:

$$f(x_0+d)=f(x_0)+f'(x_0)d+[f''(x_0)]d^2/2+$$

where $f'(x_0)$, $f''(x_0)$ etc are the $1^{st}$, 2nd etc. derivatives of fat the point $x_0$.

If we now take a small interval centered on $x_0$, for example allow d to range from $-r$ to $+r$ for some r, and examine the mean of the above expression over the interval, we see that the term in f' vanishes because the mean value of d is zero. An approximation to the mean value can therefore be made by taking $$mean(f)=f(x_0)+[f''(x_0)]*mean(d^2)/2$$

The term "mean ($d^2$)" is constant, and simply depends on the size of our chosen interval. The equality is only approximate, because the fill Taylor expansion contains higher order terms.

In the example embodiment, oriented diffusion is performed as follows: (1) Obtain the second spatial derivative f" of intensity, taken at each pixel in the direction of the ridge orientation; (2) Average this quantity over a very small neighborhood of the pixel (the size of the neighborhood used is somewhat less than the average ridge wavelength); (3) Apply the above formula to estimate the mean intensity; and (4) Repeat the above steps as often as desired.

Experimentation has shown that improvement in the ridge definition is rapid for the first few iterations of the diffusion process, hut eventually a plateau is reached at which further application of the process results in little noticeable improvement. This happens after somewhere between 50 and 100 iterations, depending on the quality of the initial image. The number of iterations may be set by experimentation based on typical input image quality.

In step 1214, a quadrature operation is applied to the image, allowing the intensity at each point to be expressed in terms of the amplitude and phase of a sine wave. The quadrature operation follows the processes disclosed by Larkin and Fletcher for obtaining the quadrature of a two-dimensional image function. The original function, together with its quadrature, may be combined to produce a complex valued function representing a periodic wave, and the phase at any point can be obtained by examining the relative values of the real and imaginary parts of the complex function.

Obtaining the quadrature requires specifying the direction of the wave normal at each point. This is at right angles to the ridges, but as noted above, it is only possible to specify the ridge orientation as being in one of two directions, 180 degrees apart. This ambiguity in the wave direction results in a corresponding ambiguity in the phase. However, the quantity of primary interest in the height of the wave at each point, measured by the cosine of the phase. The same cosine value is found irrespective of which of the two possible directions was taken as the wave normal.

The end result, then, is a map showing the cosine of the phase. In such a representation the wave crests all have the same intensity value +1 and the troughs all have the same value (-1). Prints are normally taken using a dark marking medium on a lighter background; therefore the wave crests correspond to the inter-ridge valley axes and the troughs correspond to the ridge axes. The amplitude is discarded; the cosine of the phase is the normalized image, since the cosine values lie between -1 and +1.

Finally, in step 1216, if applicable, the resultant smoothed and normalized image and the foreground mask image are each written to user-specified storage locations.

To illustrate the results of the example process of FIG. 12, FIG. 14a is an example of a fingerprint specimen and FIG. 14b is an example of a high-contrast representation of the fingerprint of FIG. 14a. In this particular high contrast representation, ridges are shown in black and furrows as white.

Referring again to FIG. 11a, now that the conversion of the image into a high-contrast representation of ridge flow in step 1102 is complete, processing continues with step 1104 where the image is skeletonized to identify the center lines of ridges or furrows.

Skeletonizing the high contrast image creates a version of the image in which the ridges are represented as pathways one pixel in width and equidistant to the original contours of the ridge. The skeleton image preserves the geometrical and topological properties of the ridges, such as connectivity, topology, length, direction, and width. Together with the distance from the skeleton points to corresponding ridge contour points, the skeleton contains all the information necessary to reconstruct the shapes of the ridges as shown in the high contrast image.

As a prelude to skeleton creation, the high contrast image is preferably thresholded to black and white. Because it is already in high contrast form, a single threshold value can be used and all pixel values above the threshold convert to white and all pixel values below (or equal to) the threshold convert to black. There are multiple methods for creating skeletons from bi-tonal images. All methods that create a skeleton that is a reliable centerline for the ridges in the high contrast image are suitable. FIG. 15*b* shows a skeleton portion taken from within the fingerprint image shown in FIG. 15*a*.

In step 1106, Bezier curves are generated along the identified ridges. This step entails creating a representation for each ridge in the form of a series of Bezier curves. These curves are a compact computable way to represent the curvature of the ridges.

Figure 16:
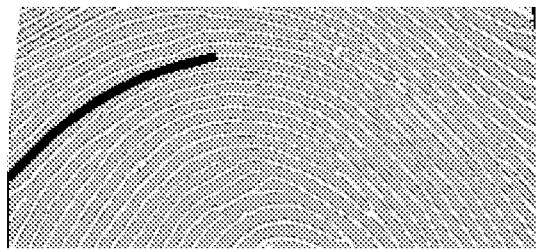
FIG. 16 illustrates an example of curve selection from a single ridge incorporating staggered starting points and overlap.

The first step in Bezier curve generation is to segment the ridges into sections. This is accomplished by establishing rules for segmentation. In an example embodiment, each curve should have a length of 260 units and curves should be generated every interval of 60 units, where a "unit" represents 1/1000 of an inch which is a common resolution for fingerprint images. FIG. 16 shows an example of curve selection from a single ridge with staggered starting points and overlap for each identified curve. In this figure, the furrows are shown in light gray and the ridges are white. The wide black segment superimposed on the ridges represents a Bezier curve segment. FIG. 16 illustrates three such segments representing the "staggering" of starting point selection. In this example embodiment the starting points are spaced by 60 units. If a single ridge is not as long as the starting point spacing (60 units in the example embodiment), the entire length of the ridge is used as a single segment.

Fingerprint ridges can be described by Bezier curves with four control points. For a set of four control points, the order of the Bezier curve is three. The first two control points are the endpoints of the edge. The remaining two control points help establish the edge points of the curve. Creating these points first assumes that each point corresponds to a time step, $t=1/m$ where m is the number of edge points.

The next step is to create a set of (order −1) basis vectors using the formula for the Bernstein polynomials. The Bernstein polynomials are given by $$B_{1,n}(t) = \binom{n}{i} t^i (1-t)^{n-i}$$

Where $$\binom{n}{k}$$

is a binomial coefficient. The Bernstein polynomials of degree n form a basis for the power polynomials of degree n. For the algorithm herein described, n=order −1 and i=1, . . . , m. Note that each basis vector has m values. Next, regression vectors are constructed using the (x, y) values given by the edge points. Scale all (x, y) values so that x has the endpoints at interval [0, 1] and y has the endpoints at interval [0, 1], where xShift=x-value at the first edge point.

xScale=x-value at last edge point x-value at first edge point.

yShift=y-value at the first edge point.

yScale=y-value at last edge point y-value at first edge point.

At each edgepoint, compute $t=j/m$, $j=0, \ldots, m-1$. Transform all the x-values by:

xNew[j]=xVal[j]-xScale$^{n+1}$-xShift

Similarly transform all the y-values:

yNew[j]=yVal[j]-yScale$^{n+1}$-yShift

Figure 44:
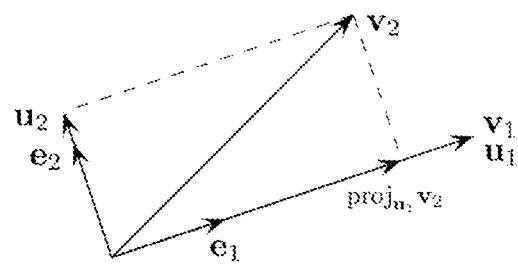
FIG. 44 is a graphical depiction of equations associated with the Graham-Schmidt process.

Once the basis and regression vectors all of length m have been created, a Graham-Schmidt orthogonalization routine is used to determine the values of the two missing control points. These values are the best control points possible computed to minimize the error between the Bezier of the specified order and the supplied edge points. In an embodiment, the projection operator is defined by $$proj_u(v) = \frac{\langle v, u \rangle}{\langle u, u \rangle}$$

where ⟨v,u⟩ denotes the inner product of the vectors v and u. This operator projects the vector v orthogonally onto the line spanned by vector u. This, and the following equations related to the Graham-Schmidt process are graphically depcited in FIG. 44. The Graham-Schmidt process is then applied as follows:

$$u_1 = v_1, \quad e_1 = \frac{u_1}{\|u_1\|}$$

$$u_2 = v_2 - proj_{u_1}(v_2), \quad e_2 = \frac{u_2}{\|u_2\|}$$

$$\vdots$$

$$u_k = v_k - \sum_{j=1}^{k-1} proj_{u_j}(v_k), \quad e_k = \frac{u_k}{\|u_k\|}$$

The first two steps of the Gram-Schmidt process are described as follows: The sequence $u_1, \ldots, u_k$ is a system of orthogonal vectors, and the normalized vectors $e_1, \ldots, e_k$ form an orthonormal set. The calculation of the sequence $u_1, \ldots, u_k$ is known as Gram-Schmidt orthogonalization, while the calculation of the sequence $e_1, \ldots, e_k$ is known as Gram-Schmidt orthonormalization as the vectors are normalized.

To check that these formulas yield an orthogonal sequence, first compute $\langle u_1, u_2 \rangle$ by substituting the above formula for $u_2$, the result is zero. Then use this to compute $\langle u_1, u_3 \rangle$ again by substituting the formula for $u_3$ with result equal to zero.

Geometrically, this method proceeds as follows: to compute $u_i$, it projects $v_i$ orthogonally onto the subspace U generated by $u_1, \ldots, u_{i-1}$, which is the same as the subspace generated by $v_1, \ldots, v_{i-1}$. The vector $u_i$ is then defined to be the difference between $v_i$ and this projection, guaranteed to be orthogonal to all of the vectors in the subspace U. The process is set up as a matrix with the following structure:

$$\begin{pmatrix} \text{Basic Vectors} & \text{Regression vectors} \\ \text{Identity} & 0 \end{pmatrix}$$

Applying the Graham-Schmidt process to the column vectors of the matrix provides:

$$\begin{pmatrix} \text{Orthogonal basis} & \text{Modified } rgression \text{ vectors} \\ \text{Junk} & \text{Coefficients} \end{pmatrix}$$

The form of the coefficients in the lower right corner of the matrix is preferably modified during the process. There are two regression vectors each corresponding to the x and y values of the data. Each column pair, where the 0 matrix was originally, contains the (x, y) coefficient information, but shifted and negative. Each (x', y') pairing is transformed using the xShift and yShift values from above. Each control point (x, y) is computed by:

$x=-1.0x+x\text{Shift}$ $y=-1.0y+y\text{Shift}$

Since this process is being used to create 4 control points, there are 2 coefficient pairings and the identity matrix in the formulation is a 2×2. The coefficients are preferably read in order.

In step 1108, Bezier Curves are generated at different intervals and lengths. In this step, using a process similar to that described in step 1106, Bezier curves for each reference print are generated and stored at multiple lengths, L, and intervals, I. In an example embodiment, Bezier Curves are generated at lengths and coarse intervals pairs, {L=260, I=60}, {L=210, I=48}, and {L=80, I=18}, and lengths and fine interval pairs, {L=260, I=5}, {L=210, I=5}, and {L=80, I=5}. If a reference Bezier curve $B_R$, with 4 ordered control points $\{B_R[1], B_R[2], B_R[3], B_R[4]\}$ is generated, then the reference Bezier curve, $B_R'$, is also generated with control points $\{B_R[4], B_R[3], B_R[2], B_R[1]\}$. This means for any reference Bezier, there exists another reference Bezier with a reverse ordering of its control points.

For a latent fingerprint, Bezier curves are sampled for each ridge initially with the largest length and coarse interval pair, for example, {L=260, I=60}). If the number of Bezier curves generated for a single ridge is less than a given threshold (for example, 10) then the ridge is sampled again at a smaller length and coarse interval pair (for example, {L=210, I=48}). Again, if the threshold is not met, the ridge is sampled again at the smallest length and coarse interval pair (in this case, {L=80, I=18}). The result is a distribution of Bezier curves across the latent print where longer ridges are represented mostly by longer Bezier curves and shorter ridges are sampled with a variety of Bezier curves of shorter lengths and intervals.

Figure 17:
FIG. 17 is a diagram showing a sample distribution of a full roll fingerprint sampled for Bezier curves as a latent fingerprint.

FIG. 17 shows a sample distribution of a full roll fingerprint that has been sampled for Bezier curves as a latent fingerprint. In FIG. 17, dark gray represents Bezier curves of {L=260, I=60} sampled from the fingerprint's ridges, light gray represents {L=210, I=48} sampling and white represents {L=80, I=18} sampling. Unlike the case of processing of full fingerprints, for Bezier curves generated from latent images, there is not necessarily another Bezier curve with a reverse ordering of its control points.

Figure 18:
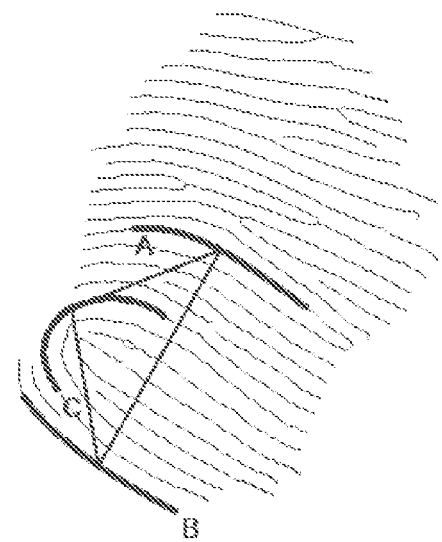
FIG. 18 is a sample distribution of a full roll fingerprint that has been sampled for Bezier curves as a latent fingerprint.

Referring again to FIG. 11*a*, in step 1110 Bezier 3-tuple sets are extracted from the generated Bezier curves. In particular, triangular sets of Bezier curves are extracted and used as the basis for comparison among fingerprints. These sets of Bezier 3-tuples are extracted pseudo randomly from the entire set of Bezier curves in the latent (as extracted in Step 1108) such that each Bezier curve exists in N (a specifiable number, in this case 5) distinct 3-tuples, if possible. N is a number determined by experimentation to produce the best results for a given type of image. In the example embodiment, N=5. In the example embodiment, for each 3-tuple, the centroids of each Bezier curve are selected to be a specified distance from each other, for example 100 pixels. FIG. 18 is an example image of a 3-Tuple set in a latent fingerprint.

Referring again to FIG. 11*a*, in step 1112, for each 3-tuple, the best matching corresponding 3-tuple of Bezier curves in the reference print is found. This is accomplished in the following manner.

Figure 19:
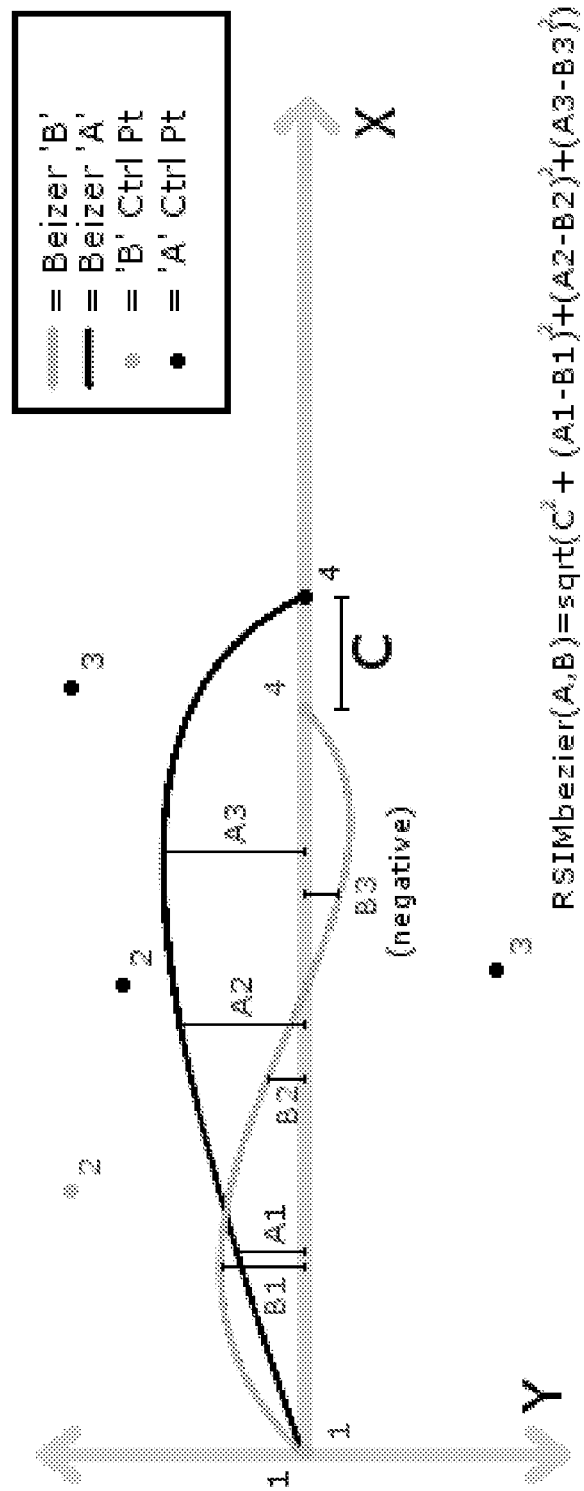
FIG. 19 is a graph showing the calculation of relative similarity between two Beziers.

$RSim_{Bezier}(A,B)$, the relative similarity between two Beziers, is defined in the following manner (illustrated in FIG. 19). The best relative geometric fitting Beziers are the Bezier curves that scored the lowest by this metric. First, the two Bezier curves are aligned along an x-axis such that each of the Beziers' starting points lie at the origin, and their ending points lie on the x-axis in the positive direction. Then, the similarity $S_{AB}=\text{sqrt}(C^2+(B1-A1)^2+(B2-A2)^2+(B3-A3)^2)$ is calculated, where C is the distance between the $4^{th}$ control points of A and B, and A1, A2, A3 and B1, B2, B3 are altitudes of the A and B sampled at t=0.25, 0.5, and 0.75 when A and B are defined parametrically.

Figure 20:
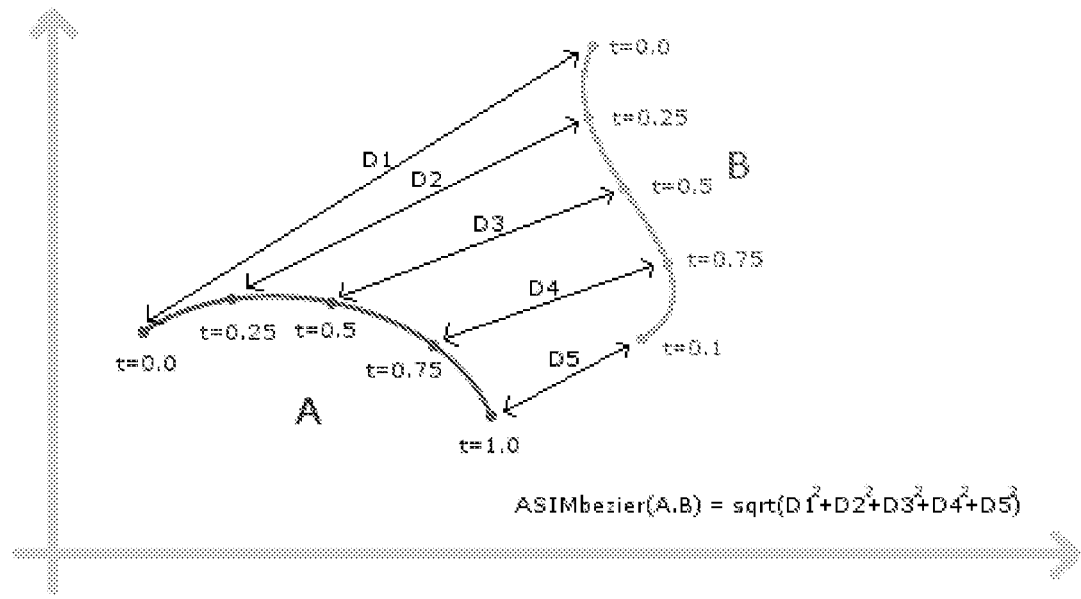
FIG. 20 is a graph illustrating sampling to determine absolute similarity between two Bezier curves.

$ASim_{Bezier}(A,B)$, the absolute similarity between two Bezier curves, is the square root of the sum of the distances between points sampled along each of the two Bezier curves (in the example embodiment, as illustrated in FIG. 20, each curve is sampled 5 times at t=0.0, 0.25, 0.5, 0.75 and 1.0 when the Bezier is defined parametrically by t). The best absolute geometric fitting Bezier is the Bezier curve that scored the lowest by this metric.

$RSim_{Tuple}(T,T')$, the relative similarity between two 3-tuple Bezier curve sets, T(A,B,C) T(A',B',C') is defined as $\text{sqrt}(RSim_{Bezier}(A,A')^2+RSim_{Bezier}(B,B')^2+RSim_{Bezier}(C,C')^2+PosSim(AB,A'B')^2+PosSim(BC,B'C')^2+PosSim(CA,C'A')^2$, where PosSim(AB,A'B') is the positional similarity between the Bezier pairs AB and A'B', and is defined as follows (illustrated in FIG. 21). The best relative geometric fitting 3-tuple is the 3-tuple that has the lowest score under this metric.

The point array for the Bezier pair AB is $P_{AB}=\{A[1],A[4],B[1],B[4]\}$, where A[n] and B[n] are the nth Bezier control points for A and B respectively.

Figure 21:
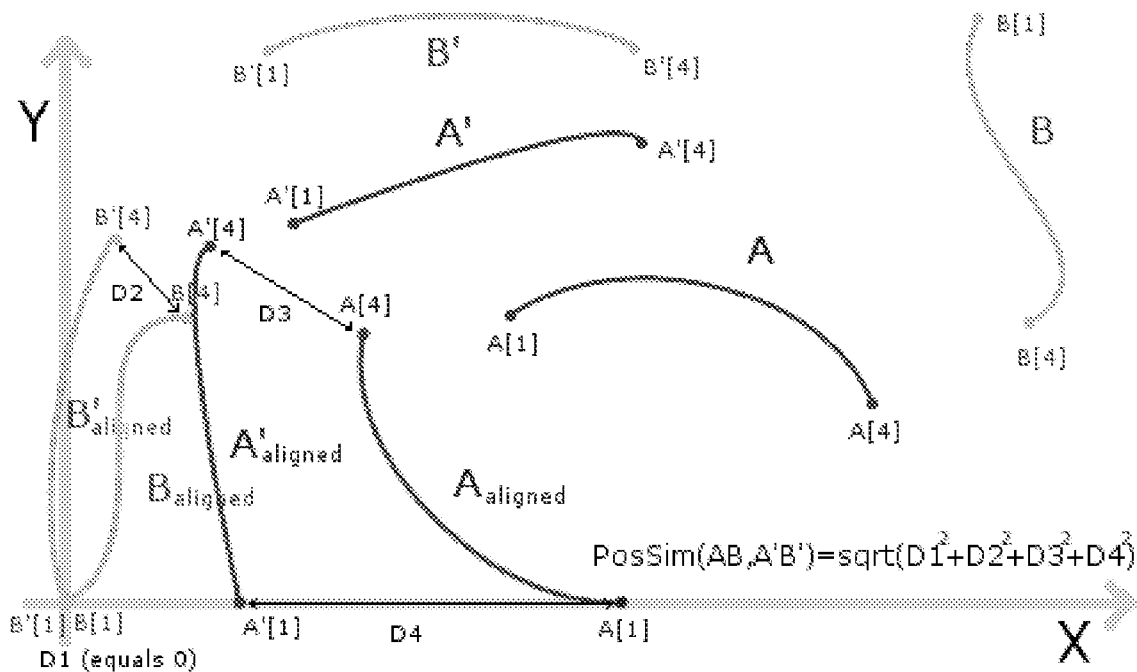
FIG. 21 is a graph illustrating determination of relative similarity between two Bezier curve sets.

$PAligned_{AB}=f_{align}(P_{AB})$ where $f_{align}(x)$ translates and rotates the vector of points x, such that first element x[0] is at the origin and the last element, x[n] is on the positive x-axis (FIG. 21)

$PosSim(AB,A'B')=\text{sqrt}(sigma(n,1,4)\{(Dist(PAligned_{AB}[n], PAligned_{A'B'}[n])^2)\})$, where Dist is the geometric distance function and sqrt is the square root function (FIG. 21).

For each of the 3-tuple Beziers, ABC, x the Bezier curves in the reference are selected and clustered in the following manner. For a latent Bezier curve, A, generated using a segment length, L, and interval I, the Bezier curves from the Reference generated from the same L and l parameters are selected. These Bezier curves are clustered into N clusters (in the example embodiment, N=10) based on shape and location similarity. FIG. 22 shows a latent Bezier curve and the associated ten Bezier curve clusters for an example reference print.

Figure 25:
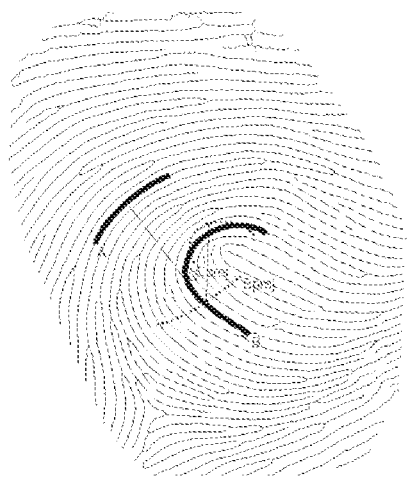
FIG. 25 illustrates a poorly-matched 3-tuple.

A 3-tuple Bezier match is found in the reference for each Bezier $RefB_{start}$ defined by the combination f: $(LatB_N, C_{N,M}, RefB_O) \to \{RefB_{start} | LatB_N = ('A','B','C'), 1 \le M, \le 10, 1 \le O \le 5\}$, where $LatB_N$ represents one of the 3 beziers in the Latent 3-tuple (FIG. 21), $C_{N,M}$ is one of M Bezier clusters in the reference based off of $LatB_N$ (FIG. 22), and O enumerates the top 5 best relative geometric fitting Bezier curves in $C_{N,M}$ to $LatB_N$ (FIG. 23). A 3-tuple Bezier match for each $RefB_{start}$ defined by $(LatB_N, C_{N,M}, RefB_O)$ is found as follows: First, the relationship $LatB_N \Rightarrow LatB_{N+1}$ is projected from $RefB_{start}$ to find $RefB_{2projected}$ in the reference. Then, the best absolute matching Bezier in the reference (generated in step 1108) to $RefB_{2projected}$ is found, which is $RefB_2$. The same is done for relationship $LatB_{N+1} \Rightarrow LatB_{N+2}$ to determine $RefB_{3projected}$ and $RefB_3$. FIG. 24 illustrates a close matching 3-tuple based on $RefB_{start}$ $(LatB_N, C_{N,M}, RefB_O)$ (for $LatB_N = $ 'A' in FIG. 18, $C_{N,M}$ is the cluster shown in FIG. 23, and $RefB_O$ is one of the highlighted Bezier curves in FIG. 23). FIG. 25 shows a poor matching 3-tuple based on a $RefB_{start}$ defined by a different $C_{N,M}$.

The similarity between $(LatB_A, LatB_B, LatB_C)$ and every 3-tuple defined by every possible $RefB_{start}$ is determined. Then, of all of the 3-tuples defined by a $RefB_{start}$, the best relative geometric match is taken as the best possible match for the latent 3-tuple.

Referring to FIG. 11a, in step 1114, the overall estimated rotational difference between orientation of the latent print and the reference print, $\Theta_{est}$, is determined. For each latent 3-tuple, $T_L$, and its best matching reference 3-tuple, $T_R$, the angle difference between their orientations is found as follows. Ang(AB), the angle of a Bezier pair AB, is defined as the angle from the mid point of A (t=0.5, when the Bezier is defined parametrically), to the mid point of B. Ang(AB, A'B'), the angle difference between two Bezier pairs, AB, and A'B', is Ang(AB)−Ang(A'B'). $Ang_{3-tuple}(T,T')$, the angle difference between the orientations of two 3-tuples, T consisting of 3 Bezier curves, ABC (T(ABC)), and T'(A'B'C'), is equal to the angle average of Ang(AB,A'B'), Ang(BC, B'C'), and Ang(CA,C'A').

The "angle average" of a set of angle measurements consists of shifting all of the values by some degree, $\Theta$, that minimizes the sum of the absolute values of the differences between all pairs of shifted angles. The "shifted average" is then taken from these values, and this "shifted average" is shifted back $\Theta$ degrees to become the final average of the angles.

The set of these angle differences, S, is taken and the angle $\Theta$, that maximizes that magnitude of the set $R(x) = \{x | x \in S, \Theta - N \le x \le \Theta + N\}$, is found, where N is an angle value. In the example embodiment N=25. The estimated rotational difference between orientation of the latent print and the reference print, $\Theta_{est}$, is the angle average of R(x).

The Bezier 3-tuple sets from the latent are re-extracted as per the instructions in step 1110, but a specifiable maximum distance is also set between the centroids of the Beziers involved in a 3-tuple set when the extraction is being done. In the example embodiment the maximum distance for this calculation is 200 pixels.

In step 1116, the best matching reference 3-tuple, $T_{Reference}$, for each latent 3-tuple (found in step 1112), $T_{Latent}$, is re-identified. The best matching reference 3-tuple in this case is such that $T_{Reference} = \text{argmin}(T', RSim_{Tuple}(T_{Latent}, T'))$ $\Theta - N \le Ang_{3-tuple}(T,T') \le \Theta + N$, T' $\in$ {all 3-tuples for the reference print}), where N is a specifiable angle. In the example embodiment, N=25). Thus the best reference 3-tuple matches are limited to ones that align with the estimate of $\Theta$.

In step 1118, two vectors of points (of equal magnitude) are selected, one for the latent fingerprint, $V_L$, and one for the reference print, $V_R$, that will serve as control points between "latent fingerprint space" and "reference fingerprint space" in order to create a transformation between the two spaces. This process begins with the empty vectors of points, $V_L$ and $V_R$. For each distinct latent Bezier, $B_{Latent}$, the set of 3-tuples (found in step 1112) that includes $B_{Latent}$ is found. For each of these 3-tuples, the Bezier, $B_{Reference}$, in the best matching reference 3-tuple (found in step 1116) that corresponds to $B_{Latent}$ is identified. $B_{reference}$ is added to the set S of reference Bezier curves that match $B_{Latent}$.

For each $B_{reference}$ in S that occurs more than once, the points $B_{reference}[1]$, $B_{reference}[2]$, $B_{reference}[3]$, and $B_{reference}[4]$ are added to $V_R$, and $B_{Latent}[1]$, $B_{Latent}[2]$, $B_{Latent}[3]$, and $B_{Latent}[4]$ are added to $V_L$. These same points are added again to $V_R$ and $V_L$ for as many times as $B_{Reference}$ occurs in S (in an example embodiment, a minimum of 2 times).

In step 1120, the control point vectors, $V_L$ and $V_R$, are used to create a transformation between latent and reference space. The first control point in $V_L$, $V_L[0]$, is "mapped" to $V_R[0]$, $V_L[1]$ is mapped to $V_R[1]$, and so on. The function f: $P_x, P_y, T_{X1}, T_{Y1}, T_{X2}, T_{Y2}, S_1, S_2, A \to P_x', P_y'$, is a function that takes a arbitrary point, P, and a set of constants, $T_{X1}, T_{Y1}, T_{X2}, T_{Y2}, S_1, S_2, A$, and returns a transformed point, P'. $f(P_x, P_y, T_{X1}, T_{Y1}, T_{X2}, T_{Y2}, S_1, S_2, A) = \{P_x', P_y' | P_x' = ((P_x - T_{X1})/S_2 * \cos(A) - (P_y - T_{Y2})/S_2 * \sin(A)) * S_1 + T_{X1}$, $P_y' = ((P_x - T_{X2})/S_2 * \sin(A) - (P_y - T_{Y2})/S_2 * \cos(A)) * S_1 + T_{Y1}$.

The function g: $V, V' \to T_{X1}, T_{Y1}, T_{X2}, T_{Y2}, S_1, S_2, A$, is a function that generates the constants for f given two vectors of points, V, V', with equal magnitudes (Note: $V_n.X$ denotes the X coordinate of the nth member of V, and $V_n.Y$ denotes the Y coordinate). $g(V,V') = \{T_{X1}, T_{Y1}, T_{X2}, T_{Y2}, S_1, S_2, A | T_{X1} = \text{sigma}(n,1,N)\{V_n.X/N\}$, $T_{Y1} = \text{sigma}(n,1,N)\{V_n.Y/N\}$, $T_{X2} = \text{sigma}(n,1,N)\{V'_n.X/N\}$, $T_{Y2} = \text{sigma}(n,1,N)\{V'_n.Y/N\}$, $S_1 = \text{Sqrt}(\text{sigma}(n,1,N)\{((V_n.X-T_{X1})^2 + (V_n.Y-T_{Y1})^2)/N\})$, $S_2 = \text{Sqrt}(\text{sigma}(n,1,N)\{((V'_n.X-T_{X2})^2 + (V'_n.Y-T_{Y2})^2)/N\})$, $A = \text{atan}(\text{sigma}(n,1,N) 55 V'_n.X*V_n.Y - V'_n.Y*V_n.X\}/\text{sigma}(n,1,N) \{V'_n.X*V_n.X + V'_n.Y*V_n.Y\})\}$.

Figure 26:
FIG. 26 is an illustration of a triangle-tessellated grid used for analysis in the example embodiment.

The latent fingerprint space is split into a triangle-based tessellated grid as depicted in FIG. 26 (the per-cell width being a specifiable number, which in the example embodiment is set at 200 pixels). A transformation f: $P_x, P_y, T_{X1}, T_{Y1}, T_{X2}, T_{Y2}, S_1, S_2, A \to P_x', P_y'$ is defined for each vertex or distortion-point, Dp, on the grid. The constants are generated by the function g: $V_{Dp}, V'_{Dp} \to T_{X1}, T_{Y1}, T_{X2}, T_{Y2}, S_1, S_2, A$, where $V_{Dp}$ is a subset of $V_{Reference}$ and $V'_{DP}$ is a subset of $V_{Latent}$. $V'_{Dp}$ is determined by taking the set of points within $V_{Latent}$ in the ring of square, tessalated grid cells neighboring Dp. If a specifiable minimum number of points in $V_{Latent}$ are not found (in this case, 5), then the points in the next ring of square, tessellated grid cells are included. This pattern continues until the minimum is met. $V_{Dp}$ is then the set of points in $V_{Reference}$ that map to the points in $V'_{Dp}$. Each point Dp can now be transformed into reference space by its function f: $Dp_x, Dp_y, T_{X1}, T_{Y1}, T_{X2}, T_{Y2}, S_1, S_2 A \to Dp'_x, Dp'_y$, with the constants generated by g: $V_{Dp}, V'_{Dp} \to T_{X1}, T_{Y1}, T_{X2}, T_{Y2}, S_1, S_2, A$.

Because each of the three vertices of each triangle in the latent's tessellated grid can be transformed into reference space, an affine transformation matrix, M, can be defined for that triangle that will transform any point within that triangle in latent space into reference space. Also, the inverse matrix, $M^{-1}$, will transform any point lying in the transformed triangle in reference space back to latent space.

Figure 27:
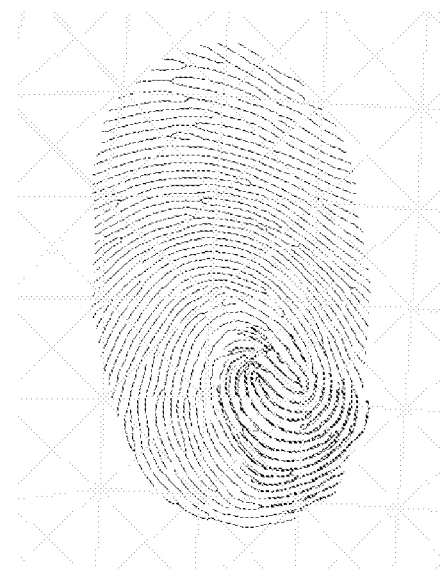
FIG. 27 is a depiction of a reference print with a latent partial print overlay.

When all points within the grid have an associated transformed point in reference space (with what will be called the "transformation grid"), the latent print can be "overlaid" onto the reference print as shown in FIG. 27. There is also an "inverse transformation grid" that transforms any point in reference space to latent space (if a reference point lays outside of the transformed grid, the transformation is based off of the inverse matrix, $M^{-1}$, for the closest geometric grid triangle to the reference point.

In step 1122, the transformation grid is refined using two new control point vectors $V_{RefinedL}$ and $V_{RefinedR}$. Each Bezier curve in the latent print, $B_L$, (sampled at length L and interval I) is transformed into reference space via the transformation grid created in step 1120. Each of the physical pixel points of the Bezier curve are transformed into reference space, and a new Bezier, $B'_L$, is calculated using the processes defined in step 1106. The best absolute geometric fitting Bezier in the reference print to $B'_L$ ($B_R$), is found out of the set of reference Bezier curves created from sampling length L, at the "fine" interval (in the example embodiment this interval is 5).

If $ASim_{Bezier}(B'_L, B_R) < \varepsilon_L$, where $\varepsilon_L$ is a specifiable threshold specific to L, then the points $B_R[1]$, $B_R[2]$, $B_R[3]$, and $B_R[4]$ are added to $V_{RefinedR}$, and $B_L[1]$, $B_L[2]$, $B_L[3]$, and $B_L[4]$ are added to $V_{RefinedLatent}$. The transformation grid is recalculated using $V_{RefinedLatent}$ and $V_{RefinedRefrence}$ in the process in step 1120.

In step 1124, a set of latent-to-reference Bezier pairs is created. This is accomplished in the example embodiment by taking the entire set of Latent Beziers, and for Bezier A, finding the best matching reference Bezier A', based on the transformation of the latent to reference space, Atrans. Then, the original latent Bezier, A, is paired with the best matching reference transformed into latent space, A'trans, to provide a set of Latent=>Reference Bezier pairs (A, A'trans).

In step 1126, for each pairing, five points on each curve in the pairing are identified: two endpoints, two quarter points and one center point. FIG. 21 illustrates corresponding curves identified in latent space and reference space.

In FIG. 11a, step 1128, feature vectors are created for each curve in the pairing set, incorporating the ten values related to the points (five 'x' values and five 'y' values). These feature vectors are created using the x and y coordinates from the Bezier curve. FIG. 21 illustrates a sample curve and data vector that it produces.

As shown in step 1130 in FIG. 11a, the Root Mean Square Error value for each pairing of vectors is computed, based on the regression of the reference vector on the latent vector.

Following step 1130, processing continues in step 1132 as shown in FIG. 11b. In step 1132, the RMSE values are captured and stored for each Bezier curve in the latent print and each reference print for which there is a match.

In step 1134, steps 1108 through 1132 are repeated for each reference print being considered to obtain a corresponding data set for each reference print.

In step 1136, for both the Latent and Reference Print Bezier curves in the pairing, a ten dimensional feature vector is created, composed of the 5 x-values and 5 y-values of the five points on a curve as defined in steps 1126-1128.

In step 1138, the feature vector for the Latent Bezier is projected via regression onto a subspace defined by the feature vector of the inverse image of the corresponding Reference Print Bezier. The root mean squared error (RMSE) from the regression is recorded. For each Latent Bezier, this regression is repeated for the paired Bezier in every reference print.

In step 1140, a first score is determined. For a single Latent Bezier curve, the negative of the logarithm of the ratio of RMSE projection errors for two reference prints (i and j) provides an anti-symmetric similarity score comparing Reference Prints i and j for that one Bezier association. For the single Latent Bezier curve, these scores form a square anti-symmetric score matrix of logarithmic function values for which the (i,j) entry and the (j,i) entry have the same absolute values but different signs. The dimension of the score matrix is the size of the reference print database. Each of the positive scores in row i of the matrix is awarded to the Reference Print that corresponds to row i.

In step 1142, a second scoring algorithm is now defined. The feature vector for the Latent Bezier is projected via regression onto a subspace defined by the feature vectors of the inverse images of the corresponding Reference Print Beziers from both reference prints i and k. For reference print I, the $n^{th}$ root of the product of the root mean squared errors (RMSEs) from the regressions over all reference prints k is recorded. Here n is the number of other reference prints k that contribute factors to the product. The calculated value is then a geometric mean of RMSEs. For each Latent Bezier, this regression-based calculation is repeated for the paired Bezier in every reference print i.

In step 1144, a second score is determined. For a single Latent Bezier curve, the negative of the logarithm of the ratio of geometric means is calculated (in the manner described previously) for two reference prints (i and j) provides an anti-symmetric similarity score comparing Reference Prints i and j for that one Bezier association. For the single Latent Bezier curve, these scores form a square anti-symmetric score matrix of logarithmic function values for which the (i,j) entry and the (j,i) entry have the same absolute values but different signs. The dimension of the score matrix is the size of the reference print database. Each of the positive scores in row i of the matrix is awarded to the Reference Print that corresponds to row i.

In step 1146, the scores that are calculated in steps 1138 through 1144 are used individually and in combination to rank order the reference prints relative to the accuracy of the matchup between the Bezier curve in the Latent and the inverse image of the paired Bezier curve in a reference print.

The scores processed in step 1146 identify the prime reference print candidates for a match to the Latent. In step 1148, additional information is introduced that aids in further assessing the accuracy of the transformation between the Latent and a reference print. In particular, additional information is obtained based on the formation of triples of Beziers in the Latent and high-scoring triples are identified.

First, a pair of high match potential reference prints is selected. The scores are pooled (as described with reference to step 1144) for the pair of reference prints and the better scores are selected from the pool along with their associated Bezier curves in the Latent. The selected Bezier curves are ranked according to multiplicity of score matrix scores awarded to the pair of reference prints; see the description relating to steps 1138 and 1140 for the anti-symmetric score matrix associated with a Latent Bezier curve. Triples of the Latent Bezier curves are formed based on the ranking information. For instance, starting with the best-ranked Latent Bezier curve, form the triple consisting of it and the following two Latent Bezier curves. This formation of triples continues until all ranked Latent Bezier curves are exhausted.

In step 1150, analogous to the process set forth in step 1136, a 30-dimensional feature vector is formed from the triple by stacking the feature vectors of the individual Bezier curves. This is done for the Latent Bezier curve triples and for the corresponding Bezier curve triples in each reference print. The feature vector for the Latent triple is projected via regression onto a subspace defined by the feature vector of the inverse image of the corresponding Reference Print triple. The root mean squared error (RMSE) from the regression is recorded. For each Latent Bezier triple, the reference print with the smaller RMSE is awarded this triple. Statistical assessments are made of the breadth and quality of the coverage of the Latent by the Latent Bezier triples awarded to each of the reference prints. The statistical assessments lead to quantitative and visual criteria that are used to identify the most promising matches to the Latent from among the reference prints.

In the case of multiple Latent images from a single questioned print, the scoring described in steps 1138 through 1150 is preferably fused to provide an aggregate assessment of the most promising matches to the questioned print from among the reference prints.

In step 1152, a fusion score is calculated based on the scoring matrices formed in steps 1140 and 1144. First, the mean of the positive scores in row i of the scoring matrix is calculated and this mean score is awarded to the Reference Print that corresponds to row i. For each reference print, each of the of multiple Latent images from a single questioned print provides a factor in a fused score which is based on the product of the reference print's scores from the separate images. The fused scores for the reference prints are used to rank and differentiate the reference prints based on the aggregate of the multiple latent images.

Figure 28:
Figure 29:
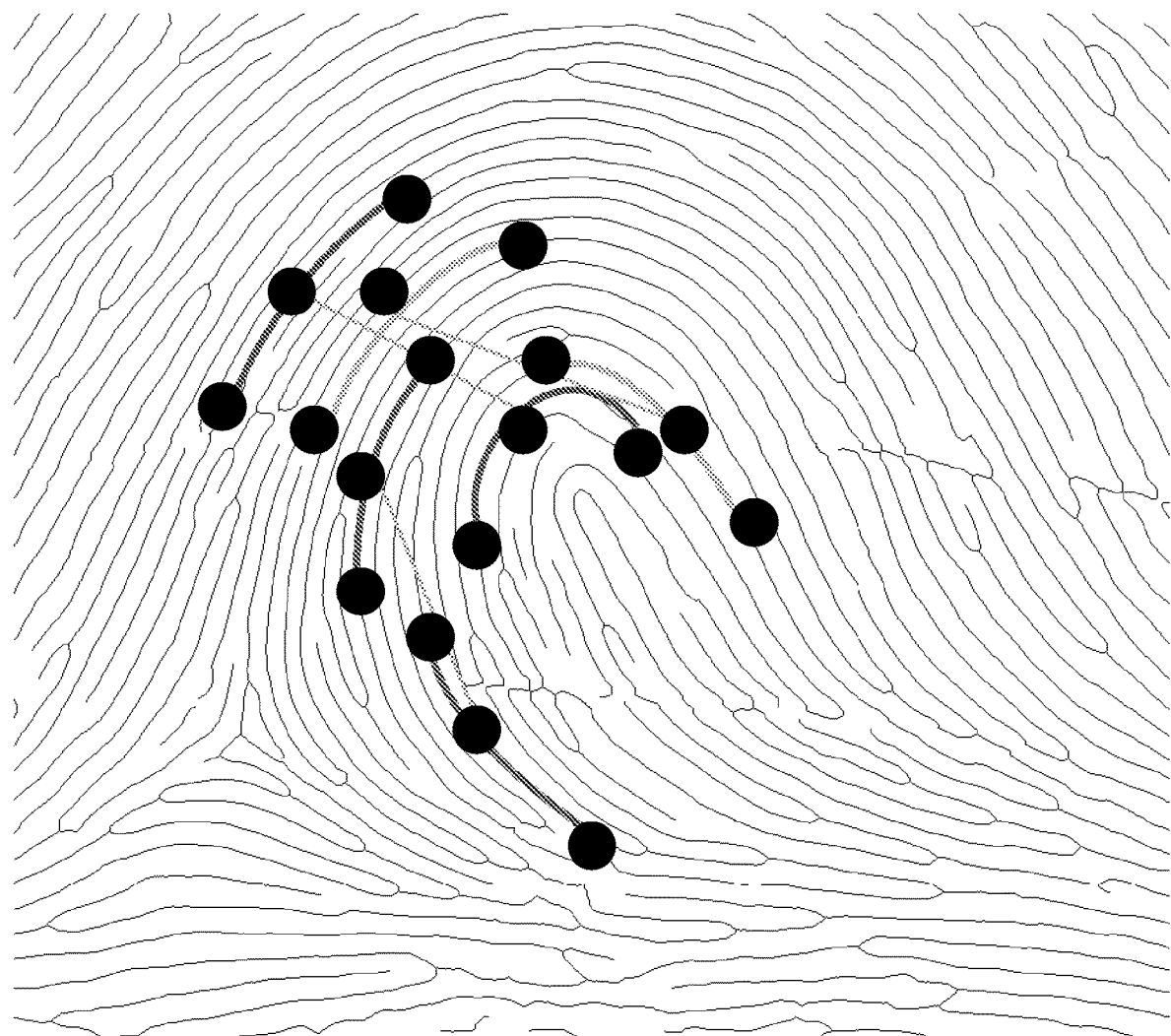
FIG. 29 is a diagram of the fingerprint of FIG. 28 with edge and vertex components highlighted.

In example embodiments that include step 1154, isomorphic graphs are used to identify embedded relationships among Bezier curves. In step 1154, to expand the power of the vectors described in step 1146, these graphs are used to build vectors with more than three curves considered in concert. The graphs are preferably constructed by combining Bezier curve triplets identified in the manner disclosed previously. In an example embodiment, corresponding Bezier curve triplets are combined in both Reference and Latent space to combinations of six curves or more. Each of these combinations can be represented by a graph. In one embodiment, a representation of such a graph is created by connecting the centroids of each Bezier Curve. In another embodiment, a representation is created by connecting all end points of the curves. In each case, the points on the curve represent "vertices" of the connecting graphs and the lines connecting these points become the "edges" of the graph. The curves themselves can also be considered to be graph edges. FIG. 28 shows corresponding graphs from matching latent and reference fingerprints. FIG. 29 shows the same view with the edge and vertex components of the graph highlighted.

Referring again to FIG. 11b, in an embodiment analysis of graphs is performed using keys. As shown in step 1156, graphs are converted into keys that can be used to test for graph isomorphism. Using this method, two graphs that are isomorphic will yield the same key. Step 1156 is preferably performed in the manner described in U.S. Pat. No. 7,724,956, the disclosure of which is incorporated herein by reference. In the patent, this method is applied to handwriting recognition and graph isomorphic keys are generated for graphs representing handwritten characters. The current invention uses the same general technique, but isomorphic keys are generated from the graphs created from groupings of Bezier curves in fingerprints rather than from handwritten materials.

In an embodiment, for each grouping of six or more Bezier curves, a graph is produced for the reference and latent prints. These graphs are then processed by the method disclosed herein to produce isomorphic keys. If the isomorphic keys match, the geometric information from the individual Bezier curves is used to create feature vectors that can be compared and scored using the methods described in Steps 1138 through 1146. Furthermore, the methods described for fusion of scores in Steps 1148 through 1152 can be used.

Running this process for an individual latent print will generate a ranked list of identities associated with enrolled references. Because the information contained in each latent fragment may be sparse and many fingerprints are similar, the correct identity may not be at the first rank in the list. However, if the latent matched the corresponding section of the reference, the correct identity should have a high rank in the list. FIG. 10 shows four latent fragments automatically fitted into a reference tenprint using the process herein described.

Table 1 shows the rankings of the individual fragments shown in FIG. 10 against a reference set containing 26 prints. In three cases, the individual fragments scored in the first rank and in one case the score was the second rank. This table is provided to illustrate the concept that latent fingerprint fragments yield individual scores, which can be aggregated to create a combined "fusion" score reflecting the collective power of the individual scores. The numbers shown in the table are for illustration purposes only and not intrinsic to the present invention.

TABLE 1

| Fragment | Score | Results Ranking |
|---|---|---|
| 1 | 0.879484028032467 | 1 |
| 2 | 1.03680359245485 | 1 |
| 3 | 0.919407790205601 | 2 |
| 4 | 1.04433318600005 | 1 |

These scores can be summed and show a very strong score for the correct reference print in the first rank.

Because the individual latent print scores are derived the same computational process, it is possible to leverage data across multiple latent fragments to improve the accuracy and efficacy of the overall score. The invention encompasses a range of embodiments in combining these scores. One example embodiment treats the individual latent results as if they were all derived from a single latent print and adds the scores together. Another example method creates a candidate score for each individual latent based on averages of the logarithms of odds-style ratios. These ratios can be combined through multiplication.

Pre-processing of fingerprint images for comparison and the subsequent comparisons may be performed in a single location, either using a single computing device, or with the software/firmware functions divided among two or more computing devices. Alternatively, reference images and latent images may first be analyzed to obtain a Bezier representation of their ridge structures, either at the same or different locations. The comparison may then be performed at either of these image processing locations, or at a third location. Those skilled in the art will appreciate that dividing the electronic processing steps in any of many possible ways, using different processors, or even different locations, does not remove any part of the overall operation from the range of embodiments contemplated by the inventors. The inventors contemplate that any desired division of processing between processors and sites may be constructed within the scope of the invention. The process may be divided between an unlimited number of locations and processing devices. Thus, after digital processing of the electronic fingerprint image to convert segments of friction ridges appearing in the image to digital representations of curvature of said friction ridge segments, the digital representations will be electronically transferred to a comparison environment, whereby features represented in said digital representations may be compared with the fingerprint reference data. The comparison environment may be the same processor used to create the digital representations, in which case the transfer to the comparison environment may merely constitute the loading of comparison software instructions into the processor. If the comparison environment is a different processor or is at a different location, this transfer may involve conveying electronic information between different computing devices, using storage devices, a local area network, the internet, a private network, or another of the large number of data transfer mechanisms known to those skilled in the art.

Figure 13:
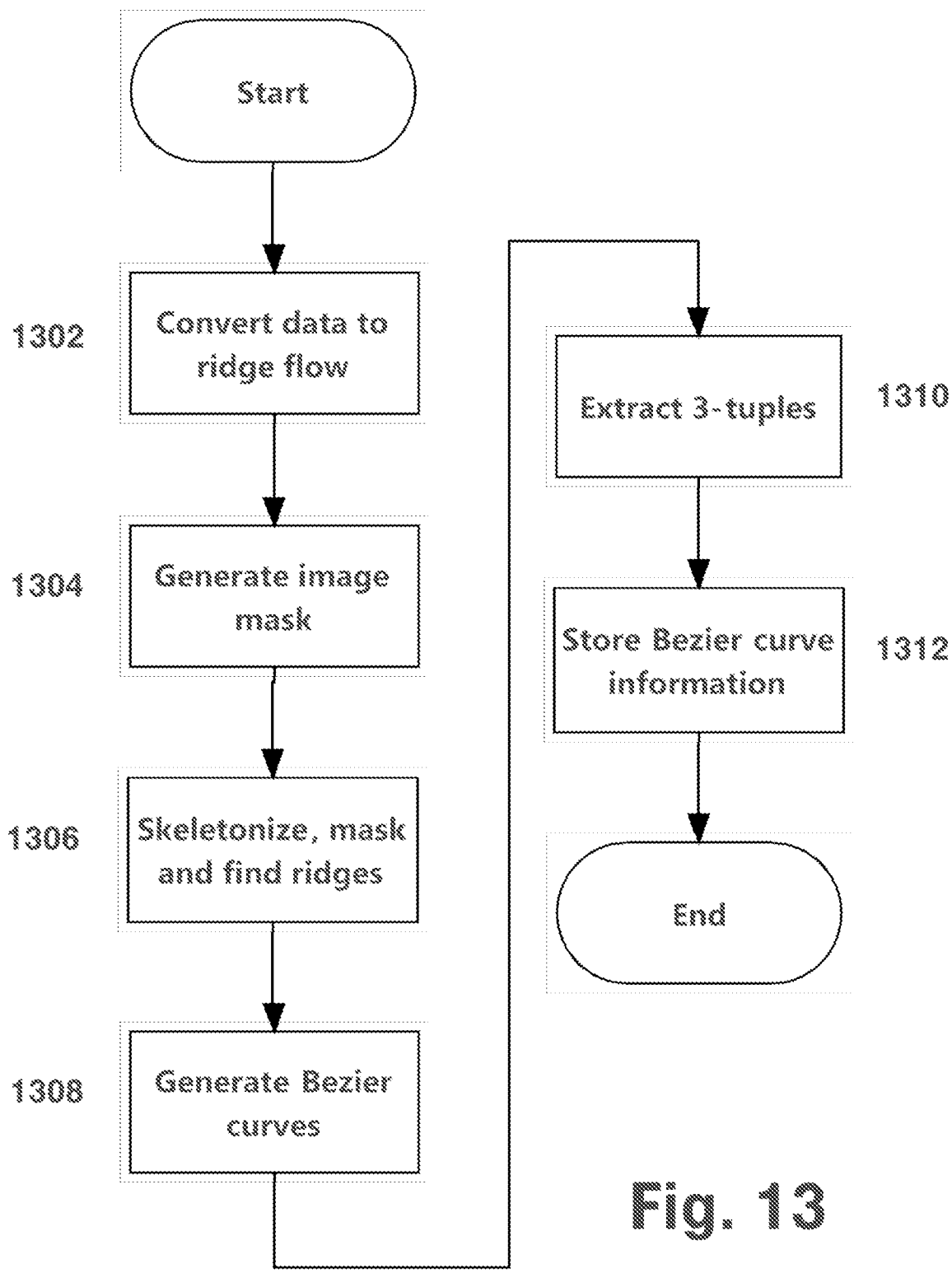
FIG. 13 is a flow chart showing an example embodiment of a process for processing reference prints.

In another significant embodiment, useful ridges are harvested from badly deteriorated images of fingerprints. The first step that creates the high contrast image has an inherent capability to generate a mask for those areas where ridge quality is sufficiently good to extract ridges. FIG. 13 is a flow chart showing an example embodiment of a process for creating reference prints.

In FIG. 13, the process for creating reference prints begins with step 1302, where the reference fingerprint is converted into a high contrast representation of ridge flow. In the example embodiment, this step is performed as described with reference to the flow chart of FIG. 12.

Next, in step 1304, an image mask is generated to isolate areas of the print having sufficient quality to support processing. In step 1306, the image areas are skeletonized, isolated by the image mask, and centerlines of ridges (or furrows) are identified.

In step 1308, Bezier Curves are generated along the identified ridges. In an example embodiment, each curve has a length of 260 units and curves are generated every interval of 60 units.

In step 1310, a set of Bezier 3-tuples are extracted from the entire set of Bezier curves such that each Bezier curve exists in 3 distinct 3-tuples (if possible). In an embodiment, for each 3-tuple, the centroids of each Bezier curve are preferably at least 100 pixels from each other, and at most 200 pixels from each other. A more local determination of the transformation can be obtained based on information about the rotation. Finally, in step 1312, the Bezier curve data is saved in a database.

In a further embodiment, a novel process is provided that makes possible the real time automated extraction of fingerprints from paper documents under field conditions without damage to the original document, and identifications based on these fingerprints.

In an example embodiment including this feature, a non-destructive imaging technology is used to reveal the ridge structures of fingerprints on paper, preferably without chemical processing. Then the ridge-based analytical methods disclosed herein are used to examine and identify matches for the fingerprints and partial fingerprints found on the paper, in the manner described above. An example embodiment of a method of processing latent fingerprints found on paper substrates includes the step of: providing a UV-based or comparable imaging system designed to exploit the reflective properties of oils and amino acids in latent fingerprint, taking one or more images of the latent fingerprints, and processing the image data using various techniques for ridge-based analysis and comparison of fingerprints as described herein to match the fingerprints or partial prints to reference prints.

An added benefit of this method is that it requires no special understanding of fingerprints to use and thus eliminates the need for a fingerprint expert during forensic review of sensitive sites. The novel combination of UV imaging of prints residing on paper and the novel ridge-based fingerprint analysis disclosed herein provides a portable forensic capability that can be field deployed providing immediate forensic feedback from paper documents.

In an example embodiment, latent print detection and enhancement is accomplished using illumination from an Ultraviolet light source coupled with a High Dynamic Range ("HDR") image capture technique HDR is a method that assembles multiple exposures are assembled into a single composite image to maximize detail in the image. The image in FIG. 30a shows a fingerprint imaged from a paper document using UV light and HDR photograph. The ridges are visible, but the image does not show details of traditional minutiae, that is, physical characteristics within the fingerprint such as ridge bifurcations (splitting) and ridge endings. UV is not the only method that can be used for revealing fingerprints on paper. Another method involves heating the paper which will make the fingerprint visible to light frequencies other that UV for observation and photographic capture.

FIG. 30b shows the ridges that can be automatically extracted from this fingerprint image. While ridge flow is clearly delineated, only one traditional minutiae point—a bifurcation—can be reliably detected and is shown within the circle. This feature alone would be insufficient to support automated matching of this print against a reference collection. Automated fingerprint searching requires that a latent print contain a sufficient number of minutiae to support searching. Latent fingerprints extracted from difficult media such as paper contain much less information that prints obtained directly obtained from fingers and often lack sufficient minutiae for searching using traditional methods.

Figure 31:
FIG. 31a illustrates entry of a password on a smart phone.
FIG. 31b illustrates partial prints from password entry.
FIG. 31c shows further detail of the partial prints.

In another embodiment, the present invention is incorporated into a smart phone or other portable device to "unobtrusively" identify the user for security or user preference setting purposes. FIGS. 31a, 31b, and 31c illustrate an example of integrated fingerprint capture within the passcode entry process without requiring any overt action by the user to provide these prints—such as pressing the finger on a separate sensor as is required by current sensing and identification methods. FIG. 31a shows a hand selecting a passcode on a liquid crystal or LED display equipped with fingerprint sensing capability. FIG. 31b shows how fingerprints can be captured during the passcode entry process. FIG. 31c illustrates fingerprint specimens captured by this method, consisting primarily of fingertips rather than the flat area of the print required by conventional minutiae-based methods. Although FIGS. 31a, 31b and 31c present fingerprints provided through entry of a passcode, the same method holds true for the finger touching the sensing screen for any purpose such as pointing or interacting with the device in any way.

In the case of an embodiment implemented in a smart phone or similar device, the present invention need not be restricted to prints captured through interaction with the screen. Sensors anywhere on the device can be employed to capture various views of fingerprint whether they are the fingertips, sides, knuckle areas or even parts of the palm of the hand. In this embodiment, the fingerprint sensor can be provided on a portable device, such as a smart phone or other type of cell phone or even a mouse or touch pad connected to a computer. The fingerprint sensor can collect information directly from contact with a finger. According to this embodiment, the interaction with the device and collecting the fingerprint samples can be melded into a single, dual-function interaction effectively turning the user's finger into a "biometric pointer."

In another embodiment, the present invention is used as a forensic or investigative tool by combining various fingerprint fragments into a single collective measure of identity. FIGS. 32a, 32b and 32c show sample sources of latent fingerprint fragments. FIG. 32a provides a sample of a latent fingerprint fragment on an expended shell casing. FIG. 32b shows a part of a fingerprint on an Improvised Explosive Device ("IED"). FIG. 32c shows latent prints on the surface of a cup where distortion and smudging may eliminate much of the useful area of the print. The present invention can be used to aggregate the collected information in multiple ways: (1) individually by fusing data from fingerprint parts acquired from the same object; (2) locally by fusing data from fingerprint parts collected at the same site such as a crime scene; and (3) geographically by fusing data from fingerprint parts collected in the same geographical location. When captured from their sources, these latent fingerprints will resemble the images shown in FIG. 1a and may represent fragments from a single finger or multiple fingers from the same individual.

The analytical methods and systems disclosed herein for fingerprints can be applied, in an example embodiment, in a portable device such as a cell phone to provide various forms of access (e.g., cyber or physical access). The device may incorporate multiple biometrics as a means of access control. Together, the device and biometrics provide a portable means for individuals to authenticate their identity with a high degree of security.

Specific biometrics that can be captured using a portable device, such as a cell phone, include, but are not limited to, fingerprints, handwriting, a signature, a voice, facial features, hand geometry, skin features, motion, vital signs, and/or capacitance.

In an embodiment, biometric identification based on handwriting, fingerprints, or voice (as examples) can be naturally combined with the act of entering a password to create a particularly strong means of access control. A person could key in a password on an input device (e.g., virtual keyboard) fitted with a fingerprint sensor, write the password on a sensor with a stylus or using his or her finger, or speak the password into a portable device. In this manner, the biometric information can be captured within the same interaction as entering the password. This is just an example, and other types of biometrics can be used in conjunction with a password, even though they may not meld as naturally with the inputting of the password. In alternative embodiments, biometrics can be used for independent identification, that is, without a password.

The embodiments disclosed provide a means for expanding protection beyond what a password can provide by establishing an identity from one or multiple biometric sources. An identity can also be corroborated among the multiple sources. Multiple biometric sources can be "fused" to determine a single identity, or in an embodiment, confidence scores as to one or more potential identities. This improved form of access control has numerous applications, including commercial applications. The power of fusing multiple biometrics can actually eliminate the need for the passcode depending on the level of protection desired.

In various embodiments, the disclosed systems and methods enable access control (in some example embodiments, using a portable device) using one or more of the following:
(1) Combination of biometrics with a passcode;
(2) Combination of biometrics with other biometrics, incorporating fusion; and/or
(3) Combination of multiple fused biometrics and a passcode.

I. Graph-Based Recognition

In an example embodiment, a single algorithm is employed to handle multiple and varying types of biometric information ("biometric modalities"). Furthermore, the results from multiple biometric modalities can be fused. Biometric samples can include, but are not limited to, a handwritten document, fingerprint, signature, voice recording, iris scan, vital sign, motion, or vascular signal. Handwriting, signatures, fingerprints, and many other biometrics are natural graph structures. In other words, they are composed of curves (i.e., edges) and crossings (i.e., vertices). In addition, patterns in an iris can be readily rendered as a graph structure using techniques such as edge detection. Voice signals can be processed into graph structures using more sophisticated methods. Similarly, a face can yield numerous "landmarks" that can be depicted as graphs and processed by graph-based methods. Rendering such biometric samples typically yields a large, complex, graphic structure that is segmented into a very large number of smaller graphs. These smaller graphs or sub-graphs, labeled "graphemes," are the containers of the biometric information derived from different types of biometrics.

In some embodiments, these methods use graph-based recognition based on a graph definition to quantify a biometric sample. A more detailed explanation of these techniques can be found, for example, in U.S. Pat. No. 5,267,332 (entitled "Image Recognition System" and issued Nov. 30, 1993), U.S. Pat. No. 7,724,956 (entitled "Systems and Methods for Identifying Characters and Words in a Document" and issued May 25, 2010), and U.S. Pat. No. 7,362,901 (entitled "Systems and Methods for Biometric Identification Using Handwriting Recognition" and issued Apr. 22, 2008). All three of these documents are incorporated herein by reference.

Biometric recognition may begin with: (1) assigning each graph to a topologically isomorphic class; and (2) computing a vector of physical features for the graph. The feature vectors for any pair of isomorphic graphs may then be aligned for a mathematical comparison to determine whether they match. These capabilities can be applied in an identical or similar manner to each separate biometric modality, both for building a reference database of interesting persons, and for verification against that database. In an embodiment, the only step that differs between the treatment of biometric modalities is transforming the biometric sample into its graph-based representation.

In an embodiment, this similarity in application of the recognition process for different biometric modalities carries through to the definition of sub-classes, in the form of graphemes within each isomorphic class of graphs. Information from a graph's physical feature vectors is used to define the sub-classes. Further, the biometric recognition technique may model biometric individuality within each grapheme sub-class of each isomorphic class of graphs in the same manner, regardless of the biometric modality for which it is being used. These computations can be performed off-line on biometric reference samples to create a reference database that can be subsequently used for the verification of identities.

A biometric sample presented for verification may be rendered and processed into a collection of grapheme-level elements using the above process. This rendering can be performed as an efficient real-time task. Each individual in the reference database can be associated with a similarity score for every instance of a grapheme from a presented biometric sample of interest. Scores can be summed across all instances of graphemes in the presented biometric sample to calculate a total similarity score for each individual in the reference database. In an embodiment, once the instances of graphemes are identified for a biometric sample, each biometric modality can use the same algorithm to calculate similarity scores.

Using the above process, it is possible that only the methods used to render a biometric sample into a graph structure may differ between biometric modalities. All of the other process steps may use an identical computational engine. Research indicates that the application of a common computational engine yields similarity scores that are mathematically comparable for all biometric modalities. This favorable property can be exploited as a basis for fusing the results from various biometric modalities. Use of a single algorithm or set of algorithms for all biometric modalities improves efficiency, since one software module can be used for all biometric modalities and does not need to be altered in order to support additional biometric modalities, as long as the biometric modality can be translated into a graph-based structure.

Graph-based recognition may be applied to biometric scenarios, for instance, as follows.

For enrollment of an individual:
(1) Collect biometric specimens (e.g., handwriting, voice, fingerprint, iris, etc.);
(2) Convert raw data obtained from the biometric specimens into a graph-based data structure;
(3) Extract graphemes (embedded sub-graphs) from the overall graph-based data structure;
(4) Analyze graphemes to distill biometric content;
(5) Load extracted biometric content into a biometric profile database; and
(6) Transmit database to identification device.

For identification of an individual:
(1) Collect biometric specimens (e.g., handwriting, voice, fingerprint, iris, etc.);
(2) Convert raw data obtained from the biometric specimens into a graph-based data structure;
(3) Extract graphemes (embedded sub-graphs) from the overall graph-based data structure;
(4) Compare extracted graphemes to stored graphemes in the biometric profile database;
(5) Tabulate grapheme-specific scores; and
(6) Tabulate scores and assign confidence results.

As noted above, many of these steps can be performed by the same computational engine despite the use of different biometric modalities. For instance, in an embodiment, for both the enrollment and identification scenarios, steps (3)-(6) can be performed by the same algorithm(s), software, and/or computational engine, regardless of the biometric modality being analyzed or processed. In another example embodiment, customized matching engines can be used for one or more of the biometrics used.

II. Fingerprints

In an embodiment, a fingerprint sensor is provided on a portable device, such as a smart phone or other type of cell phone. Information can be collected by the fingerprint sensor directly from contact with a finger. According to an embodiment, the entering of a password and the fingerprint samples can be melded into a single, dual-function interaction that can both control access like a password while limiting access to a particular individual like a biometric. In this embodiment, the biometric information can be obtained from a fingertip (as opposed to the flat area of the finger) while the password is being selected by the user of the device. Effectively, the user's finger becomes a "biometric pointer."

A useful feature in establishing such a biometric pointer is the ability to capture biometric information from an individual's fingertips. In a preferred embodiment, the fingerprint analytical methods based on ridge identification and contours are used to match partial fingertip prints to reference data, in the manner described previously. Fingertips fall into a class of prints labeled as "latent" fingerprints. It is estimated that the surface of an average latent print is approximately 21% of the available surface area of the full print, with fingertips typically providing an even smaller percentage.

While the "rolled" or "flat" surface of the finger are conventionally used for identification, fingertips are the part of the finger that is most commonly used in most computer-related interactions. For instance, typing is principally performed with direct contact between fingertips and the keyboard. Touch-screens are most likely to be operated by fingertip contact. Thus, an opportunity arises if the biometric content of fingertips can be harnessed to establish an identity of a user during the user's interaction with an electronic device. More specifically, if the biometric content of the fingerprints can be captured while an individual is entering a password and then used to corroborate the identity of the user, the protective power of the password is greatly enhanced. This power can be further enhanced by requiring the user to employ different fingers to select different characters within the password.

G. Example Implementation

Since, as disclosed above, ridge-specific markers make the rapid, automatic capture of fingertips possible, one embodiment uses typical methods for entering passwords, but with the disclosed innovative fingertip recognition technology incorporated. According to an embodiment, the fingerprint sensor may be integral to a device's display screen, such as an LCD or LED screen. The actual method can involve an optical sensor, a charge-coupled device (CCD), a capacitance-based sensor, or another method. In an embodiment, the sensor can reside on top of the LCD or LED which is visible through the sensor. Thus, a touchpad can be displayed on the screen to permit a user to type out a password.

FIG. 31a illustrates a device with a virtual keypad display, according to an embodiment. A user of the device can enter a password by pressing the virtual keys on the virtual keypad. As the keys are pressed, biometric information from the fingertips may be captured by the touch-screen (e.g., using a fingerprint sensor or optical sensor). The biometric information can be used to establish the identity of the individual typing the password into the device. In an embodiment, to create stronger protection, the fingers may be varied or required to be varied while inputting different characters of the password.

FIG. 31c provides a schematic representation of data produced by the biometric pointer method described herein.

The line figures in FIG. 31c represent two arrays of fingerprint sensors. Each sensor also represents a numeric identifier (e.g., ranging from 0 to 9). It should be understood that each sensor can represent other types of identifiers or characters (e.g., letters, symbols, icons, images, etc.). A password may be entered by pressing the individual identifiers in a prescribed sequence.

FIGS. 31b and 31c illustrates the password "1438" pressed using the tip of an index finger. In an embodiment, the password captured in this manner may comprise three elements: (1) the numeric values of the keys, (2) the sequence in which the keys are pressed; and (3) the biometric content of the ridges of the fingertip used to press each key.

FIG. 31c, in particular, illustrates entry of the password using two fingers, instead of one, to select the keys. Keys 1 and 8 were selected using the same index finger as used in entering the password shown in FIG. 31b. Keys 3 and 4 were selected using a middle finger. In this manner, the biometric information can be modified to provide "stronger" password encoding.

In an embodiment, the device's display encompasses the capability to sense fingerprints across its entire surface area. Color-coding (e.g., red highlighting) can indicate keys within the virtual keyboard where a fingerprint was captured. As the passcode is entered, a password field is displayed to indicate the progression of code entry.

III. Other Biometric Modalities

Technologies previously applied to handwriting can represent potentially far-reaching solutions to both individual biometrics and their collective consideration through fusion of individual biometrics. For instance, the proven graph-based recognition, as discussed above, can support multiple biometric modalities, including handwriting, voice, fingerprints, iris, face, gait, gestures, and other biometric modalities that can be represented as graphs.

Portable devices have already been used for enrolling found documents as they are encountered in the field. Such devices can hold the summary results for modeling individuals in a reference database, which may consist of various found documents and relational demographic information. Using these portable devices, it possible to make real-time decisions based on the found documents.

In an embodiment, such devices can be enhanced to include enrollment and analysis functions for biometric modalities. Reference databases for separate modalities can be aggregated or "fused." Each separate modality may have its own associated reference database, or be combined into a single reference database. Furthermore, in the spirit of opportunistically found information, the various operational reference databases may be populated with biometric samples which have been collected either from robust sensors or in the fashion of crime scene investigations. Field hits to any of the reference databases can provide database linkage information, enabling real-time decision-making in the field.

Graph-based recognition, as described above and in the prior patents and applications incorporated by reference, provides a single approach for treating most major forms of biometric information as graphs. What follows is a discussion of some specific biometrics that can be addressed by a single algorithmic solution using graph-based recognition. The biometrics described include handwriting, voice, fingerprint, iris, face, and vascular biometrics, but the systems and methods disclosed herein are not limited to these biometric modalities. Notably, there is a strong similarity between these various biometrics in terms of a suitable computational engine. This similarity can be exploited in order to "fuse" the biometric modalities into an aggregate and corroborative method of identification.

A. Handwriting Identification

Graphs offer a means for extracting a wealth of information from handwriting, and can be used across multiple languages. This information includes the identity of the actual words written, as well as insight into the individual writer, class of characters, and the language being written. Handwriting, as a biometric, works by quantifying graphical features, available within an individual's writing, into a "loss less" data structure which preserves the topology and geometry of the original writing.

The data structure underlying handwriting biometrics is rooted in graph technology and captures both the topology and hundreds of detailed physical measurements from written forms. Using this graph-based format, handwriting biometrics employ statistical methods to distill the topology and physical features into a "Biometric Kernel." This Biometric Kernel is the statistically derived subset of those measurements that captures the essence of an individual's handwriting. In other words, the Biometric Kernel consists of those features that remain most consistent within an individual's writing and vary the most across multiple different writers. Once the Biometric Kernel is established, handwriting biometrics can be applied to any unknown sample of handwriting, such that a handwriting reference database can return the nearest valued reference providing the closest match to the writing sample in question. The application of graph-based recognition to handwriting biometrics is discussed in U.S. Pat. Nos. 7,362,901 and 7,724,958.

FIG. 33 illustrates the "workhorse" units of the graph-based recognition techniques driving handwriting biometrics: the graphemes. In FIG. 33, each of the different shades within the handwritten Arabic characters represent one grapheme. These units are embedded forms that can be automatically isolated within an individual's writings, stored, and ultimately detected in questioned documents to identify the author.

B. Signature Identification

Biometric signature identification can incorporate both graph-based recognition, as well as a concept similar to ridge-specific markers. A handwritten signature is first decomposed into graphemes, which are analyzed in a manner identical to handwriting biometrics. Afterwards, the physical relationships among the graphemes are analyzed in a manner similar to the ridge-specific marker method, discussed above, to ensure that the positions of the graphemes in the signature are comparable to that expected in the signature.

Figure 35:
FIG. 35 illustrates a sample signature entered into a portable device, according to an embodiment.

FIG. 34A illustrates an original signature, whereas FIG. 34B illustrates the signature after being divided into graphemes, and linkages which chart the relationship among the graphemes. FIG. 35 illustrates entry of the signature on a portable device for the purposes of accessing a resource.

C. Speaker Identification

The goal of speaker identification is to identify a person from captured or recorded speech. Graph-based recognition offers this opportunity. Although speech is commonly represented as a one-dimensional, time-domain signal, it is most natural to work with speech in the frequency domain. In the frequency domain, a spectrogram provides magnitude and phase information, power, and spectral density.

To date, work has experimentally shown that representations of speech based on linear predictive coding (LPC) are well-suited to transforming multiple speech components into a two-dimensional "graph." This graph can have significant biometric power. LPC provided the foundation for the modern, digital cell phone (e.g., Global System for Mobile Communications (GSM)) and Voice over Internet Protocol (VoIP) communication systems, in which speech is compressed using a suitable type of encoder before being transmitted across a digital data network. The receiving system decodes the compressed data using an appropriate decoder to recover the speech. It is proven that LPC can carry biometric information, since the users of such systems are able to recognize each other by voice. LPC is a crude, but honest, model of the speech generation mechanisms in humans. Hence, a number of ways to exploit LPC and its biometric characteristics are disclosed herein.

Figure 36:
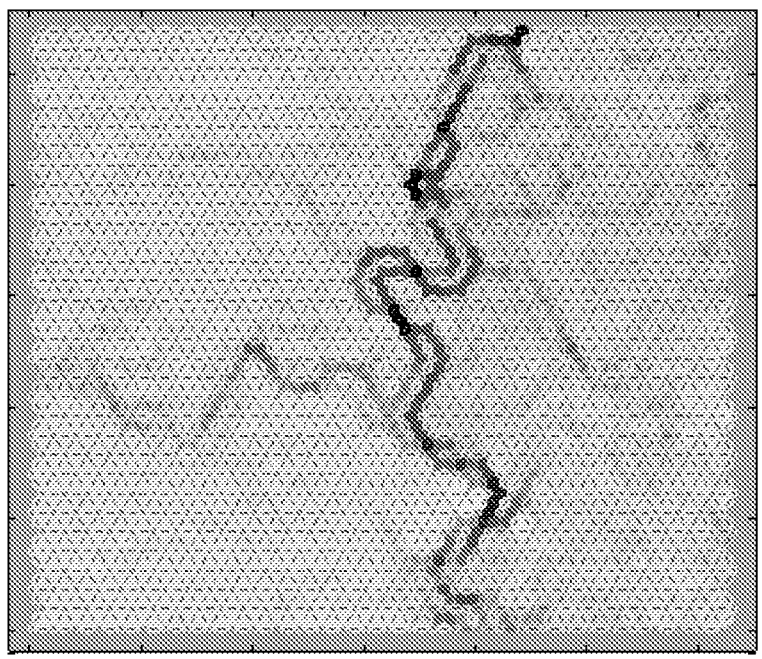
FIG. 36 illustrates an example set of phoneme clusters learned by a self-organizing map (SOM) neural network, according to an embodiment.

In one experiment, computations involved computing sixteenth-order LPC feature vectors from an input speech signal. These sixteen-dimensional feature vectors were then mapped onto a two-dimensional plane using a self-organizing map (SOM) neural network. SOM has long been used to recognize speech signals. It has also been shown that SOM can learn to produce a two-dimensional, tonotopic map of a speech signal. The resulting map is a two-dimensional cluster of the phonemes, an example of which is illustrated in FIG. 36. In other words, SOM is a topology-preserving, non-linear dimensionality reduction algorithm. The dark lines in FIG. 36 show the boundaries between the phoneme clusters.

In an embodiment, after training the neural network on a representative sample of speech signals, the entire collection of speech signals, in time-order, can be fed through the network with the network in recall mode. The neural network responds to each LPC feature vector in the input sequence by activating a series of points on the two-dimensional map, with one active point per LPC vector. By interpolating a short sequence of these active points using a cubic spline, a glyph, such as the snake-shaped glyph illustrated in FIG. 37, can be obtained.

Figure 37:
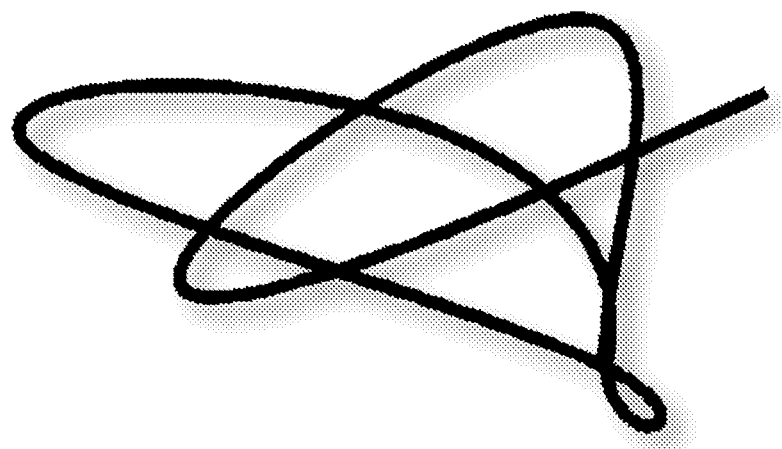
FIG. 37 illustrates an example glyph traced from a tonotopic map according to an embodiment.

Notably, the snake-shaped glyph in FIG. 37 resembles a handwritten character. Hence, graph-based recognition can be applied to these glyphs. Thus, in an embodiment, a collection of graphemes whose distributions resemble those of biometric data can be extracted from a handwriting sample. This approach is able to extract and exploit biometric information contained within LPC feature vectors. Significantly, such an approach applies the exact same methodology as used in handwriting to a very different form of data.

Figure 38:
FIG. 38 illustrates a portable device incorporating speaker identification access technology, according to an embodiment.

FIG. 38 illustrates the use of a portable device, such as a cell phone, as an access device incorporating speaker identification. In an embodiment, a person is instructed to recite a password, and the system uses voice-to-text recognition to identify the password and speech identification to recognize the individual.

D. Face Recognition

Biometric face identification—commonly known as facial recognition—has many important uses in today's security-sensitive world, along with other biometric identification techniques. However, today's biometric techniques are not generally capable of remotely and discreetly identifying a person moving about in a large crowd. Face identification can be a very powerful tool, since, unlike fingerprints, voice prints, and many other biometric techniques, face identification may be performed discreetly from a distance. Moreover, an efficient, noise-resilient implementation may be used to surveil crowded places such as airports or other mass transit terminals. However, the current state of technology is neither accurate nor efficient enough for such uses.

The systems and methods disclosed herein provide a technique that is sufficiently accurate, efficient, and resilient for deployment in a high-volume, high-noise environment. Face identification may be viewed as a pattern-matching problem. The solution consists of the following steps: face acquisition, feature extraction, and feature matching.

During acquisition, the face is detected and segmented from a wide-field image. Significant facial features, such as a jaw line, inter-ocular distance, nose profile, mouth shape, and the like, may be extracted from the segmented face. These features can then be stored in a reference database.

To find a match, the query face may be segmented and its features extracted. Next, the query face can be compared against those of known individuals in the reference database. Various identification techniques emphasize different aspects of this process. While some concentrate on the acquisition step, others attempt to improve the feature extraction. Still other strive to improve the efficiency of the matching. The disclosed approach is not only accurate and efficient, but is also resilient to flaws such as partial occlusion, low resolution, and irregular lighting.

Almost all currently available face identification solutions are designed for law enforcement applications. As such, these solutions assume the existence of a high-quality image database containing both frontal and profile views of the face, as well as the availability of the same views for the query. However, in the high-threat world of today, it is not always possible to have access to clear and complete identification information on suspects, since the threat is dispersed and the suspects are plentiful. Moreover, intelligence on suspects is especially sparse during the formative stages of the threat. A face identification approach that functions reasonably well with high-noise, low-quality images would be of great utility in intelligence collection and early threat detection. Such a system would be useful in both intelligence collection and law enforcement.

Graph-based pattern-matching algorithms have proven to be accurate, efficient, and resilient in biometric handwriting identification. As disclosed herein, in an embodiment, these algorithms can be applied to face identification to achieve similar accuracy, efficiency, and resilience. Such a graph-based pattern matcher is capable of identifying partial matches by analyzing the feature set at varying levels of detail using sub-graph embedding. Even if only half of a face is visible in the query image, the algorithm can still extract a feature graph from the image. This graph is then matched against the reference graphs stored in the database at an appropriate level of sub-graph embedding. When all partial matches are ranked, the reference face(s) that represent the best match to the query image will naturally rise to the top.

To implement face identification using the disclosed process, significant facial features are extracted to construct graphs. Once the feature graphs have been obtained, the disclosed sub-graph isomorphism algorithms may be applied to perform the matching. A concept in computer vision called "interest points" can be applied to detect and extract identifiable features. The graph induced by the interest points is then the feature graph, which may be searched using graph algorithms.

Interest points are mathematically well-defined positions in image space with high local information contents that are stable under local and global perturbations. Interest points exhibit a high degree of reproducibility and are invariant in translation, scale, rotation, and shear. These properties make interest points very useful to a face recognition application.

Figure 39A:
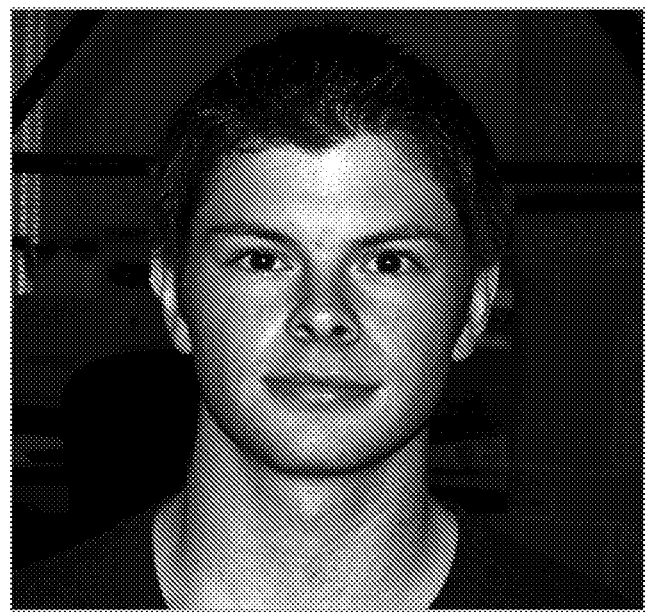
FIG. 39A illustrates an original image of a face.
Figure 39B:
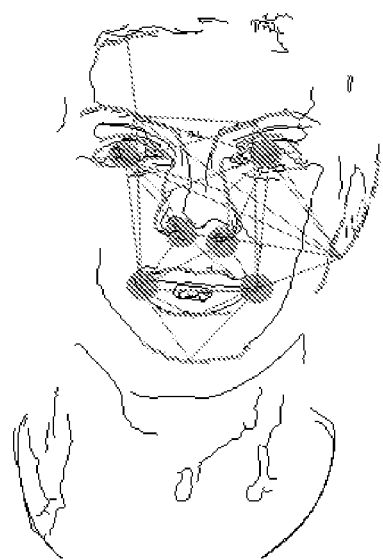
FIG. 39B illustrates example scale and affine invariance of interest points obtained from the image in FIG. 39A, according to an embodiment.
Figure 40A:
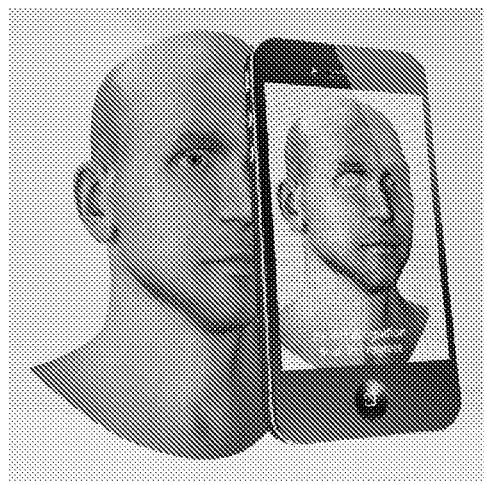
FIGS. 40A-40D illustrate multiple facial features captured independently for access purposes, according to an embodiment.
Figure 40B:
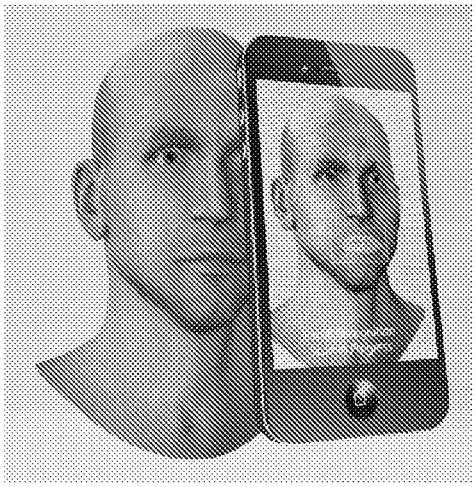
Figure 40C:
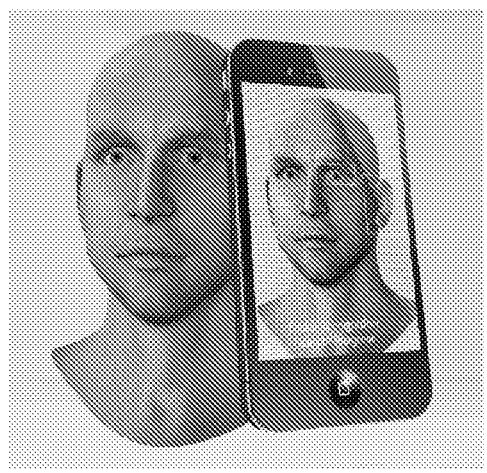
Figure 40D:
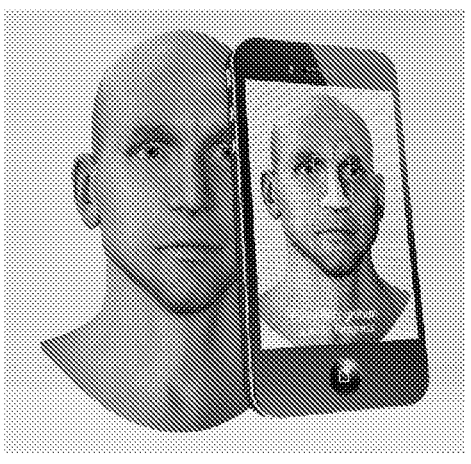

FIGS. 39A and 39B demonstrate how to exploit the properties of interest points. FIG. 39A illustrates an original image, while FIG. 39B illustrates scale and affine invariance of interest points. FIG. 39B is merely an example. In practice, complex images tend to produce many more interest points, such that they are sufficient in number to support feature comparisons between different images. From the interest points, a feature graph may be created by treating the points as vertices, and by connecting those vertices that are in identified regions to create edges.

The graph induced by the interest points can be used as the feature graph, since the interest points identify the locations of significant visual features, such as corners, edges, and other sharp transitions. Feature graphs can yield a wealth of topological and geometrical information, which can be used to compare different images at varying levels of detail. The disclosed sub-graph isomorphism algorithms can process these feature graphs. In this way, a biometric face identification algorithm can be implemented.

Facial features can be captured separately and used individually for identification. FIGS. 40A-D illustrates a series of independent facial landmarks being captured by a portable device, such as a smart phone, to be used for access identification.

E. Irises and Vein Structures

Irises and vein structures reveal distinctive physical features that can be directly expressed as graphs. The internal structures of irises and the physical structures of vein patterns are both readily capable of being represented by graphs. Iris features include collarettes, moles, and crypts. Through edge detection, each of these features can be transformed directly into a graph. Similarly, vein patterns in the scelera of the eyes as well as other vein patterns, such as on palms, yield graph-like structures.

Figures 41, 42:
FIG. 41 illustrates an example palm image and associated vein patterns obtained from the palm image, according to an embodiment.
FIG. 42 illustrates a sample fusion matrix showing individual biometric inputs leading to a final score, according to an embodiment.

FIG. 41 illustrates the nature of a vein pattern found in the palm of a hand. The common characteristic among handwriting, fingerprints, irises, and vein patterns is that they take the form of complex graphs that can be divided into embedded sub-graphs. One thing that distinguishes conditionally embedded sub-graphs from other sub-graphing schemes is that the actual creation of the sub-graphs remains fluid. Rather than predefined embedded forms, conditionally embedded sub-graphs can exist as a table of indices to multiple, and often overlapping, embedded forms within a complex graph.

F. Capacitance

Capacitance is a biometric that is related to the ability of the human body to store electricity. As a tool, capacitance measures an approximate body volume. A larger body would increase overall capacitance. A tall, thin body would trigger sensors differently than a short, fat body of the same volume. Capacitance could be directly measured by a device. Since it is a "coarse" biometric, capacitance may not be suitable for solo usage, but rather, in an embodiment, could be used in conjunction with one or more other biometrics.

G. Movement, Gait and Cadence

Human gait has been identified as a biometric with considerable promise. Although gait can be measured in several different ways—including contact instrumentation, floor sensors, and video—its principal value is that it can be measured remotely through video images. Within images, gait can be quantified several ways. For instance, a very direct method is to "plot" the movement of extremities (e.g., arms, legs, hands, feet, etc.) from one video frame to another. The result is a two-dimensional "image" of movement that is suitable for analysis by graph-based recognition. Since most smart phones have motion detectors, such as accelerometers, in an embodiment, in an embodiment, this intrinsic tool is used as a source for collecting movement data.

H. Vital Signs

Human vital signs have long been known to contain biometric information. Graph-based technology is capable of identifying individuals on as little as a single heartbeat. In an embodiment, this biometric would entail using a device equipped with a sensor capable of capturing vital sign information. Microwave based methods are available and operate quite well, especially if the sensor is in contact with the individual.

IV. Fusion of Biometric Modalities

Fusion of multiple biometric modalities can be achieved through various approaches. The common mathematical properties across biometrics, as disclosed herein, provide an opportunity to combine two or more modality scores into a joint score. Alternatively or additionally, it is also possible to approach fusion of biometrics on a post-decision basis, i.e., a determination can be made regarding the consistency or dissonance between decisions. This second approach can be accomplished using the "open set criteria" that become available, i.e., the likelihoods that an individual has been accurately identified.

FIG. 42 illustrates an implementation of biometric fusion, according to an embodiment. In this embodiment, the portable device, such as a cell phone or smart phone, collects multiple biometrics. As demonstrated in FIG. 42, each biometric can have an individual contribution 4210a-g to an overall score 4220.

Figure 43:
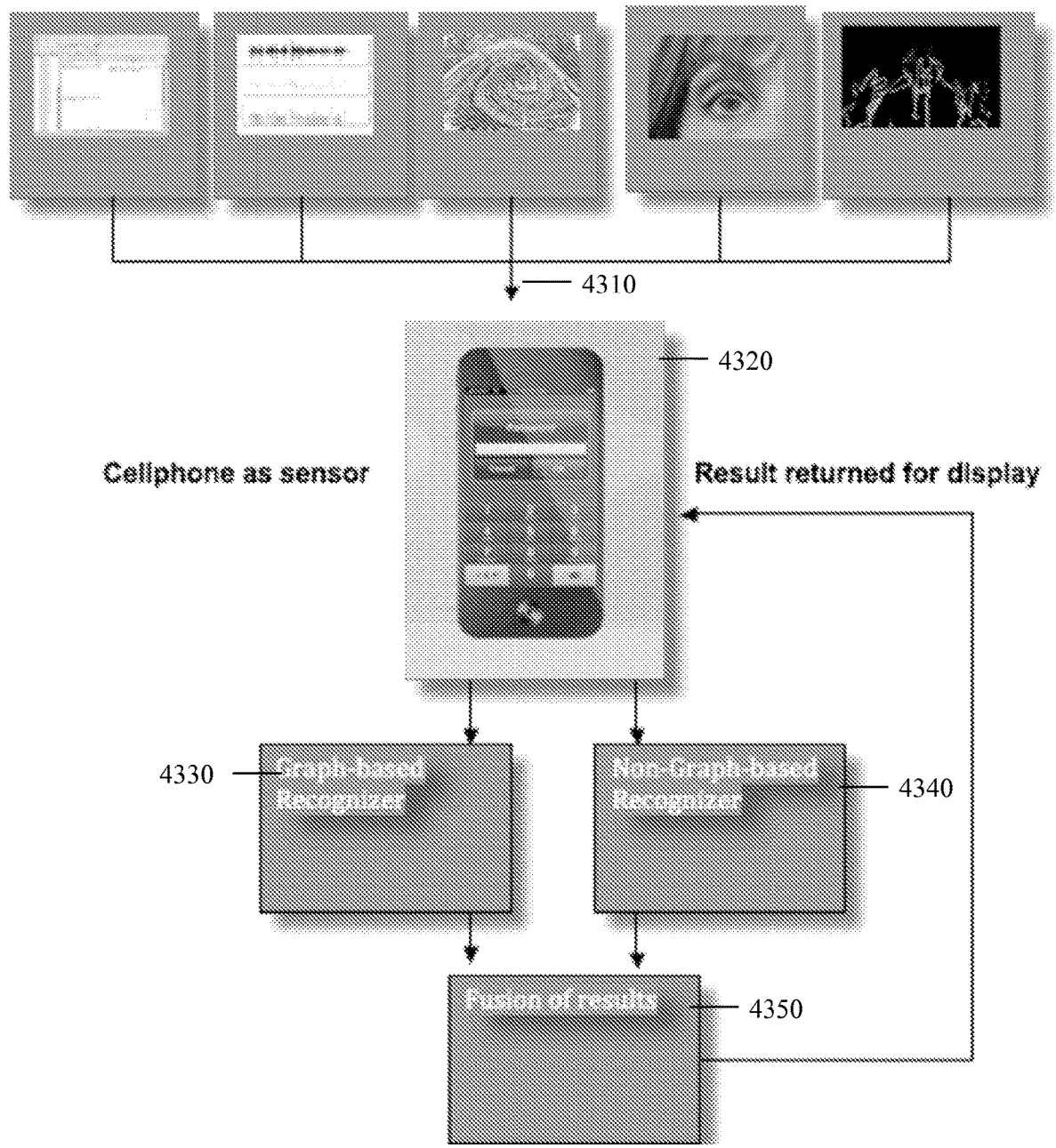
FIG. 43 illustrates a high-level schematic diagram of a multimodal biometric system and method, according to an embodiment.

FIG. 43 illustrates a high-level overview of a portable-device-based multimodal biometric system. In this system, the portable device 4320—which may be a smart phone or other type of cell phone—senses a variety of biometric signals 4310. These biometric signals may be individually sufficient to establish the identity of a user, or the results may be considered together, i.e., fused, to establish the identity of the user. As demonstrated in FIG. 43, both graph-based 4330 and non-graph-based recognizers 4340 can be used, and the results of the recognizers fused into an overall result 4350, which may be displayed on the portable device 4320. Alternatively, only graph-based recognizers 4330 can be used, with the results of the graph-based recognition of multiple biometric signals fused to produce the overall result 4350 for display on the portable device 4320.

V. Usage Example

According to conventional access control methods, in order to gain access to a physical space, users either need to carry an identification card, such as a HID card, or stop and touch or stare into a single biometric reader (e.g., fingerprint, face, iris sensor) attached to the side of an entry way to the space.

However, according to the disclosed systems and methods, a user can approach the door with his or her portable device. In an embodiment, the portable device executes an application, for instance, in response to a user interaction with an icon representing the application. The application may use sensors (e.g., touch-screen), which are integral to or in electronic communication with the portable device, to collect one or more biometrics. The system can be configured to collect any biometric or set of biometrics that the operator of the system (e.g., an employer) desires. Alternatively or additionally, the application may allow the user to select the biometrics which should be used for authentication, for example, from a set of selectable biometrics. The application can then collect the biometric(s) and transmit the biometrics to a server (e.g., via a wireless connection, such as WiFi), optionally, with a device identification number. The server may employ the disclosed methods to authenticate the user based on the biometric(s) and, optionally, the device identification number. If authentication is successful, the server may cause the door to open, thereby providing the user with access to the space.

Such a system is simple, convenient, and relatively inexpensive, and may involve, for instance:

- One (simple, thin) software integration to an existing entry access provider at Enterprise level.
- Allowing users to self-enroll at their convenience by taking images, recording, etc., and sending these collected biometrics to human resources or another department for authentication and enrollment.
- A single software application to collect all of the needed biometrics. Matching can be performed on a portable device or on a server.
- No specialized hardware for enrollment, recognition, or transmission.
- A choice of biometrics. Providing a choice of biometrics for authentication can be convenient for users and the resulting variety can enhance security.

Of course, it should be understood that this is simply one example implementation related to physical entry access. One of skill in the art will appreciate that other implementations and configurations can be understood from the present disclosure, and that applications, other than physical entry access, are possible. For instance, the disclosed systems and methods can be used to restrict virtual access, for example, to electronic and online resources, such as electronic documents stored on the portable device or a remote server or device. For example, in an embodiment, the biometrics and/or passcode may be collected to authenticate an individual, such as a consumer, engaging in a commercial transaction, such as a credit card purchase. The biometrics, which may include a signature, and/or a passcode can be collected by a portable device and transmitted to a server for comparison against one or more reference databases. If a match is found between the biometrics and a reference sample in the database(s), the identity of the user of the portable device can be confirmed, and the transaction can be authorized.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. Thus, the breadth and scope of the present invention should not be limited by any of the above-described exemplary embodiments, but should be defined only in accordance with the following claims and their equivalents. The terms or expressions herein should not be interpreted to exclude any equivalents of features shown and described or portions thereof

The invention claimed is:

1. A method for electronically comparing fingerprints, comprising the steps of:
   receiving, in a computing device, digital data representing a plurality of partial electronic fingerprint images;
   digitally processing the digital data in the computing device to convert segments of friction ridges in each partial electronic fingerprint image to a plurality of digital descriptor representations including triangles representative of curvature of the friction ridge segments;
   combining, at the computing device, two or more of the plurality of digital descriptor representations to form a fusion data set;
   electronically transferring said plurality of digital descriptor representations to a digital comparison environment to facilitate comparison with reference fingerprint data; and
   determining one or more possible matches of the partial electronic fingerprints in the reference fingerprint data based on a comparison of the fusion data set with the reference fingerprint data.

2. The method of claim 1 wherein the digital descriptor representations are derived from Bezier-based edge segment descriptors.

3. The method of claim 1 comprising the further step of combining two or more Bezier polygons to form the fusion data set.

4. The method of claim 1 wherein the combining step is performed before transferring the digital descriptor representations to the digital comparison environment.

5. The method of claim 1, wherein variable-length sections of the friction ridges are converted to the digital descriptor representations.

6. The method of claim 1, wherein the step of digitally processing the digital data comprises converting the partial electronic fingerprint images into skeleton form.

7. The method of claim 2 comprising the further step of storing Bezier descriptors representing ridge curvature in a database of reference fingerprints.

8. The method of claim 3, comprising the further steps of receiving the digital descriptor representations at the comparison environment and providing an output indicating whether the partial electronic fingerprint images are collectively a likely match for the reference fingerprint data.

9. The method of claim 8 comprising the further step of constructing complex feature vectors from multiple curve segments between prints to establish the selection of appropriate corresponding curves.

10. The method of claim 1, where in the reference fingerprint data comprises tenprints, partial sets of reference prints, or other latent prints.

11. The method of claim 1, further comprising ranking the one or more possible matches based on a score calculated based on a difference between the digital descriptor representations and the one or more possible matches in the reference fingerprint data.

12. A method for electronically comparing fingerprints, the method comprising:
   receiving, by one or more processors, data representing a plurality of partial fingerprint images;
   converting, by the one or more processors, friction ridge segments in each partial fingerprint image to a plurality of digital descriptor representations including triangles representative of curvature of the friction ridge segments;
   forming, by the one or more processors, at least one tuple of digital descriptor representations, each tuple having two or more of the plurality of digital descriptor representations;
   comparing the at least one tuple with reference fingerprint data; and
   determining one or more possible matches of the partial electronic fingerprints in the reference fingerprint data based on the comparison.

13. The method of claim 12, wherein the at least one tuple comprises three the digital descriptor representations.

14. The method of claim 12, wherein the digital descriptor representations comprise Bezier polygons.

15. The method of claim 1 wherein the at least one tuple comprises a graph having two or more Bezier polygons.

16. A system for electronically comparing fingerprints comprising:
- a database configured to store data representing a plurality of partial fingerprint images; and
- one or more processors communicatively coupled to the database and configured to
- converting friction ridge segments in each partial fingerprint image to a plurality of digital descriptor representations including triangles representative of curvature of the friction ridge segments,
- forming, by one or more processors, at least one tuple of digital descriptor representations, each tuple having two or more of the plurality of digital descriptor representations,
- comparing the at least one tuple with reference fingerprint data, and
- determining one or more possible matches of the partial electronic fingerprints in the reference fingerprint data based on the comparison.

\* \* \* \* \*